United States Patent
Xin et al.

(10) Patent No.: US 9,083,593 B2
(45) Date of Patent: Jul. 14, 2015

(54) METHOD AND SYSTEM FOR MULTIPLE TRAINING SEQUENCES FOR PEAK-TO-AVERAGE POWER RATIO REDUCTION IN PRECODED BURSTS

(75) Inventors: Yan Xin, Ottawa (CA); Shouxing Simon Qu, Ottawa (CA); Huan Wu, Kanata (CA); Michael Eoin Buckley, Rolling Meadows, IL (US); Eswar Vutukuri, Slough (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/004,676

(22) PCT Filed: Feb. 21, 2011

(86) PCT No.: PCT/US2011/025614
§ 371 (c)(1),
(2), (4) Date: Sep. 11, 2013

(87) PCT Pub. No.: WO2012/115618
PCT Pub. Date: Aug. 30, 2012

(65) Prior Publication Data
US 2014/0016721 A1    Jan. 16, 2014

(51) Int. Cl.
*H04L 27/26* (2006.01)
*H04L 1/00* (2006.01)
(Continued)

(52) U.S. Cl.
CPC .............. *H04L 27/262* (2013.01); *H04L 1/007* (2013.01); *H04L 27/2666* (2013.01); *H04L 1/0072* (2013.01); *H04L 25/0224* (2013.01); *H04L 25/03343* (2013.01); *H04L 27/18* (2013.01); *H04L 27/34* (2013.01)

(58) Field of Classification Search
CPC ... H04L 1/007; H04L 1/0072; H04L 25/0224; H04L 25/03343; H04L 27/18; H04L 27/262; H04L 27/2626; H04L 27/2627; H04L 27/2628; H04L 27/263; H04L 27/2634; H04L 27/2666; H04L 27/34; H04J 11/003; H04J 11/0033
USPC ........... 375/260, 265, 267, 262; 370/208, 210
See application file for complete search history.

(56) References Cited

U.S. PATENT DOCUMENTS

2010/0034186 A1* 2/2010 Zhou et al. .................... 370/344
2010/0091900 A1* 4/2010 Gan .............................. 375/267
(Continued)

OTHER PUBLICATIONS

International Searching Authority, "International Search Report and Written Opinion of the International Searching Authority," issued in connection with application No. PCT/US2011/025614, mailed on Nov. 18, 2011 (10 pages).
(Continued)

*Primary Examiner* — Young T Tse
(74) *Attorney, Agent, or Firm* — Fish & Richardson P.C.

(57) ABSTRACT

A method and apparatus for peak to average power ratio reduction, the method precoding the data symbols using an inverse discrete Fourier transform ('IDFT'), choosing, at a transmitter, a set of training sequence symbols from a plurality of sets of training sequence symbols, and creating, at the transmitter, an IDFT precoded burst by adding the IDFT of the data symbols and an IDFT of the chosen set of training sequence symbols. Further, a method and receiver, the method receiving a burst, performing a discrete Fourier transform on the burst, choosing a training sequence among a known plurality of training sequences sets, the chosen training sequence resulting in the least noise estimate among the plurality of training sequence sets, and demodulating the burst with the detected pilot burst.

19 Claims, 20 Drawing Sheets

(51) Int. Cl.
　　　*H04L 25/02*　　　(2006.01)
　　　*H04L 25/03*　　　(2006.01)
　　　*H04L 27/18*　　　(2006.01)
　　　*H04L 27/34*　　　(2006.01)

(56) References Cited

U.S. PATENT DOCUMENTS

2011/0116566 A1* 5/2011 Takahashi et al. ............ 375/267
2011/0211506 A1* 9/2011 Lopez et al. .................. 370/310

OTHER PUBLICATIONS

International Bureau, "International Preliminary Report on Patentability," issued in connection with application No. PCT/US2011/025614, on Aug. 21, 2013 (5 pages).

Fernandes-Getino Garcia et al., "Peak Power Reduction for OFDM Systems with Orthogonal Pilot Sequences," IEEE Transaction on Wireless Communications, vol. 5, No. 1, Jan. 2006, pp. 47-51, XP002663191 (5 pages).

Han et al., "Modulation, Coding and Signal Processing for Wireless Communications—An Overview of Peak-to-Average Power Ratio Reduction Techniques for Multicarrier Transmission," IEEE Wireless Communications, IEEE Service Center, Piscataway, NJ, US, vol. 12, No. 2, Apr. 2005, pp. 56-65, XP011130574 (10 pages).

Mahafeno et al., "PAPR Reduction Technique Using Pilot Symbols for OFDM Systems," European Transactions on Telecommunications, Wiley & Sons, Chichester, GB, vol. 21, No. 5, published online Jun. 18, 2010, pp. 435-442, XP001557114 (8 pages).

* cited by examiner

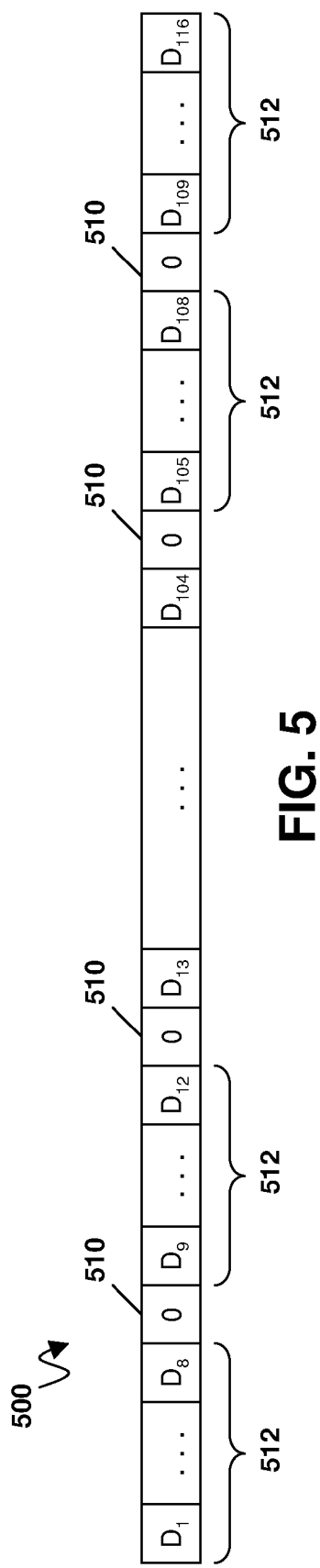

METHOD AND SYSTEM FOR MULTIPLE TRAINING SEQUENCES FOR PEAK-TO-AVERAGE POWER RATIO REDUCTION IN PRECODED BURSTS

FIELD OF THE DISCLOSURE

The present disclosure relates to bursts for data transfer in a mobile network and in particular to the peak-to-average power ratio reduction of inverse discrete Fourier transform ('IDFT') precoded transmitted bursts.

BACKGROUND

In one embodiment, the present disclosure relates to the evolved enhanced general packet radio service (EGPRS2), and in particular to IDFT precoded EGPRS2 (PCE2). The examples given in the present disclosure relate to EGPRS2 and PCE2. However, this is not meant to be limiting and EGPRS2 and PCE2 are merely examples of communication techniques.

PCE2 is an ongoing study item currently being investigated in 3GPP GERAN (GSM/EDGE radio access network). PCE2 is a new feature that is meant to improve link level performance of the EGPRS2, which results in an increase in throughput or an enhancement of coverage by applying an inverse discrete Fourier transform (IDFT) precoding technique. As will be appreciated by those in the art having regard to the present disclosure, the IDFT precoding technique may be considered an orthogonal frequency division multiplexing (OFDM) technique.

PCE2 reduces the complexity of channel equalization at the receiver so that the receiver can avoid performance loss due to the simplification of equalization for radio channels for higher order modulations. To allow minimal changes to the standards and implementation, PCE2 preserves most of the modulation and coding schemes (MCSs) of EGPR2.

One drawback to the use of an IDFT precoder at a transmitter is a significant increase in the peak-to-average power ratio (PAPR) value. Compared to EGPRS2, in PCE2 the PAPR values may be up to 8.25 dB or higher with the probability of $10^{-4}$. As will be appreciated by those in the art, this reduces the efficiency of the transmitter power amplifier due to the requirement of the large back off of the power amplifier to satisfy the requirements of spectral mask and adjacent channel power leakage, among others. The above is described, for example, in the Third Generation Partnership Project (3GPP) "*Radio Transmission and Reception*", Technical specification (TS) 45.005, v.9.5.0, Dec. 21, 2010, the contents of which are incorporated herein by reference.

BRIEF DESCRIPTION OF THE DRAWINGS

The present disclosure will be better understood with reference to the drawings, in which:

FIG. 5 is a PCE2-A data burst structure with zero values for training sequence symbols;

FIG. 6 is a PCE2-A pilot burst structure with zero values for data symbols;

DETAILED DESCRIPTION OF THE DRAWINGS

The present disclosure provides a method comprising: precoding the data symbols using an inverse discrete Fourier transform ('IDFT'); choosing, at a transmitter, a set of training sequence symbols from a plurality of sets of training sequence symbols; and creating, at the transmitter, an IDFT precoded burst by adding the IDFT of the data symbols and an IDFT of the chosen set of training sequence symbols.

The present disclosure further provides a transmitter comprising: a processor; memory; and a communications subsystem, wherein the processor, memory and communications subsystem cooperate to: precode the data symbols using an inverse discrete Fourier transform ('IDFT'); choose, at a transmitter, a set of training symbols from a plurality of sets of training sequence symbols; and create, at the transmitter, an IDFT precoded burst by adding the IDFT of the data symbols and an IDFT of the chosen set of training sequence symbols.

The present disclosure still further provides a method comprising: receiving, at a receiver, a burst; performing a discrete Fourier transform on the burst; choosing a training sequence among a known plurality of training sequences sets, the chosen training sequence resulting in the least noise estimate among the plurality of training sequence sets; and demodulating the burst with the detected pilot burst.

The present disclosure still further provides a receiver comprising: a processor; memory; and a communications subsystem, wherein the processor, memory and communications subsystem cooperate to: receive, at a receiver, a burst; perform a discrete Fourier transform on the burst; choose a training sequence among a known plurality of training sequences sets, the chosen training sequence resulting in the least noise estimate among the plurality of training sequence sets; and demodulate the burst with the chosen training sequence.

Figure 1:
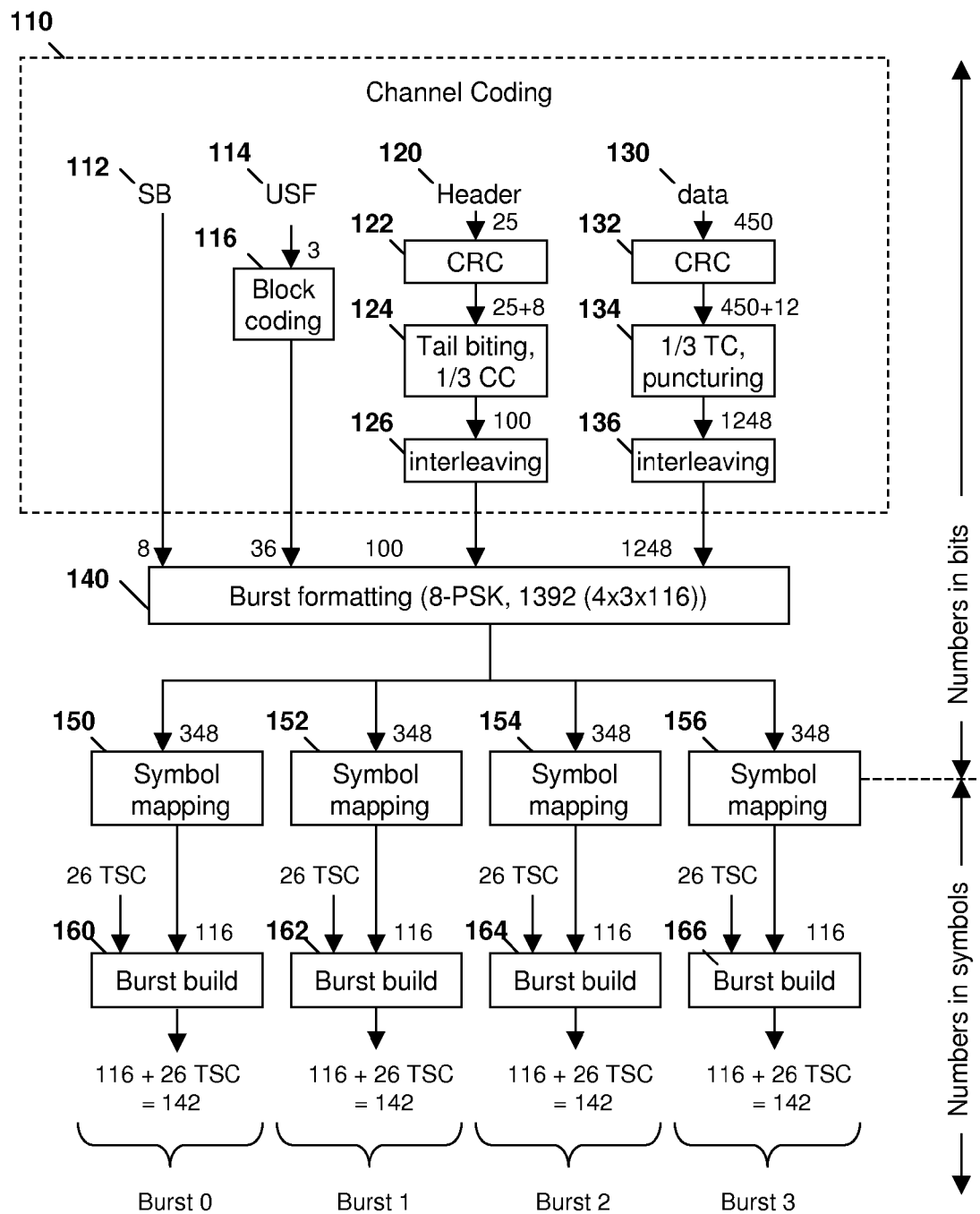
FIG. 1 is a block diagram illustrating the encoding of an exemplary EGPRS2-A DAS-5 modulation and coding scheme.

For backward compatibility, PCE2 preserves most of the modulation and coding schemes (MCSs) of EGPRS2. Reference is now made to FIG. 1, which shows the flow of channel coding and modulation for an exemplary EGPRS2 coding scheme. In the case of FIG. 1, the MCS is DAS-5. This is however only exemplary and other MCSs are known.

In the example of FIG. 1, channel coding block 110 provides 8 stealing flag bits 112 to burst formatting block 140.

Further, an uplink state flag (USF) 114 is provided to a block-coding block 116, which then provides an input to burst formatting block 140.

Header 120 is provided to a cyclic redundancy check (CRC) block 122, which then provides an input to tail bitting and 1/3 convolutional coding block 124.

The output from tail biting 1/3 rate convolution coding block 124 is provided to an interleaving block 126 which is then provided to burst formatting block 140.

Data 130 is provided to a cyclic redundancy check block 132.

A 1/3 Turbo Coding followed by a puncturing block 134 then receives the data from CRC block 132, and provides an input to interleaving block 136. From interleaving block 136 the data is provided to burst formatting block 140.

Burst formatting block 140 includes, in the example of FIG. 1, 1392 bits which are mapped into four symbol mapping blocks 150, 152, 154 and 156.

The output of each symbol mapping block is a total of 116 symbols which are then input into a build block 160, 162, 164 and 166.

After the burst build, the 116 symbols are added to a 26 symbol training sequence to produce the 142 symbol burst.

With a PCE2 the channel coding is kept the same as in EGPRS2. Hence, referring to FIG. 2, a PCE2 baseband block diagram illustrates the channel coding block 110, which provides output to a burst formatting block 210.

After burst formatting, the burst is then symbol mapped at block 212 and provided to subcarrier allocation block 214.

Modulated training sequence symbols 220 are interleaved with the data symbols from symbol mapping block 212 in the subcarrier allocation block 214 and are provided to the IDFT block 230. As will be appreciated by those skilled in the art, a training sequence is also sometimes referred to as a pilot.

The output of the IDFT block 230, is then provided to a cyclic prefix 240 which includes a copy of the symbols from the end of the IDFT output to the beginning of the block and this output block is then input into the transmit pulse shaping block 250 and is then transmitted.

Figure 2:
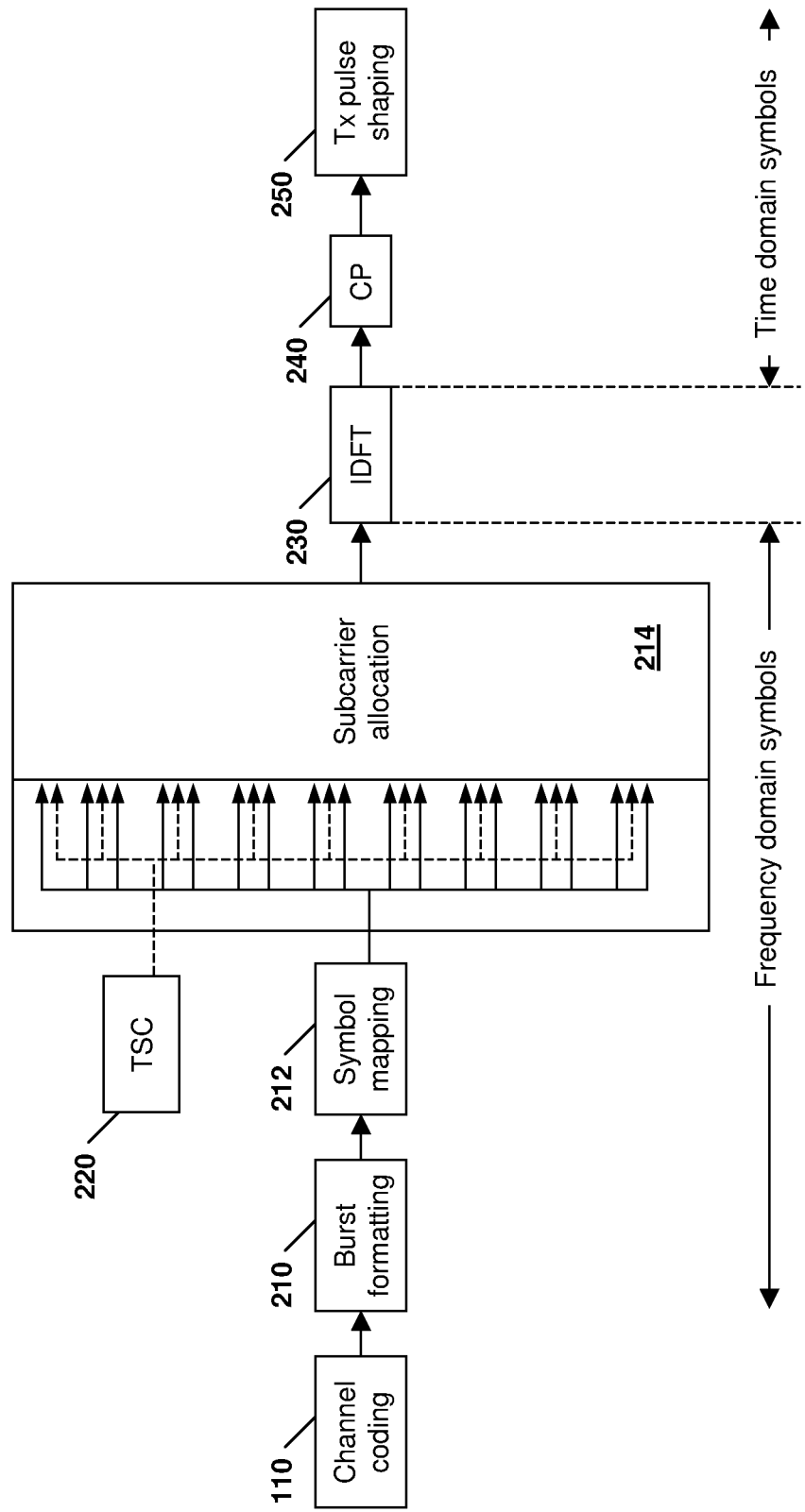
FIG. 2 is a block diagram illustrating the encoding of a PCE2 burst.

Because of the presence of the IDFT block, which converts data from frequency domain into the time domain, the symbols in front of the IDFT block in FIG. 2 are considered to be in frequency domain and the symbols after the IDFT block are considered to be in time domain.

Comparing FIG. 1 and FIG. 2, the PCE2 transmitter differs from the EPRS2 transmitter mainly from burst formatting onwards.

A burst of EGPRS2-A or EGPRS-B consists of 142 or 169 symbols respectively, in which 26 or 31 training symbols are located in the middle of the burst. A PCE2 burst has the same number of total symbols in a burst and may have the same number of data and training symbols as the corresponding EGPRS2 burst. However, unlike the EGPRS2 burst, training sequence or pilot symbols in the PCE2 burst are arranged to spread throughout the whole burst in the frequency domain because of the presence of the subcarrier allocation block, which spreads the pilot and data symbols across all the subcarriers before the IDFT operation (i.e. in frequency domain).

Figure 3:
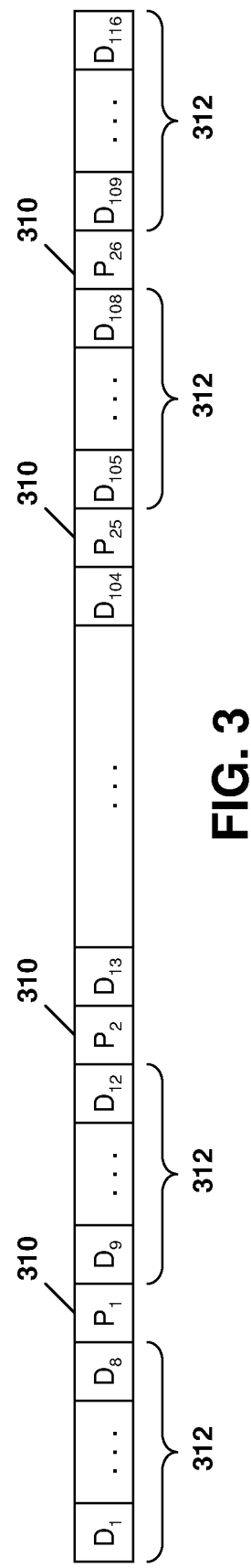
FIG. 3 is a PCE2-A burst structure with training sequence symbols distributed among data symbols.

Referring to FIG. 3, the figure shows an example of training sequence symbol allocation on a PCE2-A burst where the legacy EGPRS2 training sequence of 26 symbols can be reused as the pilot sequence and the data symbols in the burst are uniformly separated by the training sequence symbols, as possible.

As seen in FIG. 3, training sequence symbols 310 are interspersed among data symbols 312. The example of FIG. 3 is a PCE2-A burst having 142 symbols, of which 26 are training sequence symbols and 116 are data symbols. This is only one example of interleaving the training sequence symbols with the data symbols before the IDFT block. Other implementations are possible and the following discussion is equally applicable to the other implementations as well.

The peak-to-average power ratio may be calculated as follows. First, the IDFT of the signal is calculated. Assuming a length-N symbol burst of PCE2 to be $\{X_k\}$ with both data and pilot symbols. The IDFT of a PCE2 burst $\{X_k\}$ can be represented as:

$$x_n = \frac{1}{\sqrt{N}} \sum_{k=0}^{N-1} X_k e^{j\frac{2\pi kn}{N}}, n = 0, \ldots, N-1. \quad (1)$$

The signal $\{x_n\}$ is then upsampled by inserting L−1 zeros after each sample of $\{x_n\}$; where L is the upsampling factor. This upsampled signal is then convolved with the impulse response of the Tx pulse shaping filter to generate the output signal $y_n$. And the PAPR of signal $y_n$ is defined as:

$$PAPR = \frac{\max_{0 \leq n < LN} |y_n|^2}{E[|y_n|^2]} \quad (2)$$

Various modulation and coding schemes produce similar peak-to-average power ratios. In particular, reference is now made to FIG. 4 which shows a complementary cumulative density function (CCDF) of PAPR for 8-PSK, 16-QAM (quadrature amplitude modulation), 32-QAM and 64-QAM modulated PCE2-A signals. CCDF is defined as the probability that the PAPR value of an OFDM symbol is larger than a reference of the PAPR level $PAPR_0$.

Figure 4:
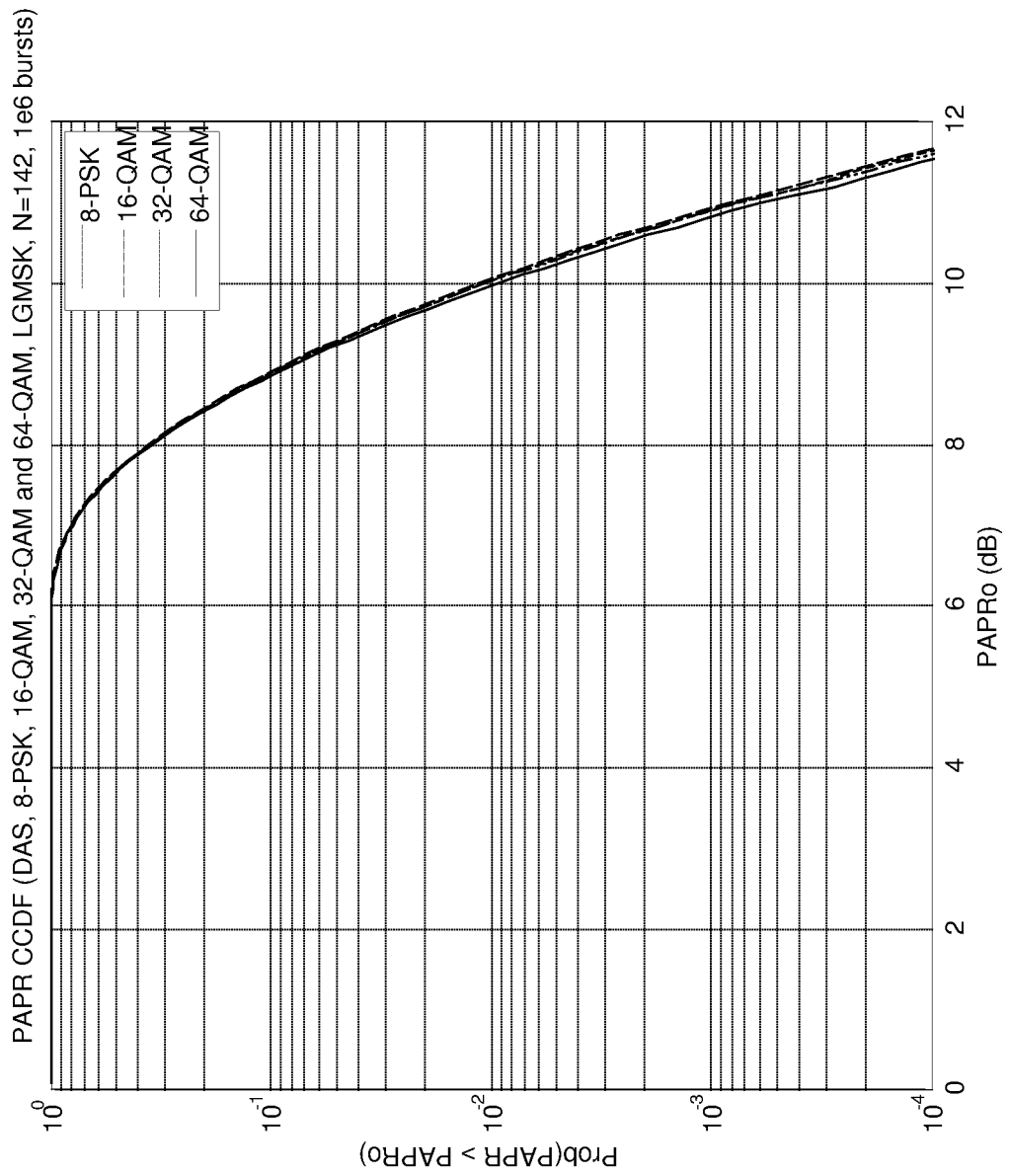
FIG. 4 is a graph showing a complementary cumulative density function of PAPR for various modulated PCE2-A signals.

In generating the results in FIG. 4, a linearized Gaussian minimum shift keying (LGMSK) transmit filter as defined in 3GPP, "*Modulation*" TS 45.004, v. 9.1.0, Jun. 18, 2010, the contents of which are incorporated herein by reference, is applied to the IDFT precoded signal $x_n$. As seen in FIG. 4, the signals with different modulation types have a similar PAPR performance and the PAPR values are higher than 11.7 dB with a probability of $10^{-4}$. For 8-PSK modulation using EGPRS coding schemes, the maximum PAPR is around 3.2 dB. Hence, with IDFT precoding there is a significant increase in the PAPR.

Various solutions exist for addressing PAPR reduction in OFDM systems and in PCE2. A first uses a tone reservation for reserving several dummy subcarriers, which do not carry any data or pilot information and are exclusively used for PAPR reduction in OFDM. The values at these reserved subcarriers are changeable while the data part of the input of the IDFT is unchanged. The PAPR values of the targeted OFDM symbol could be minimized by optimizing the value at the dummy subcarriers. The compatibility of the tone reservation for PAPR reduction depends on the number of reserved dummy subcarriers and the applied optimization algorithm.

Tone reservation is a simple technique that requires only one IDFT operation at the transmitter. At the receiver, after the DFT operation the values at the reserve dummy subcarrier are simply dropped. Tone reservation can be effective to reduce PAPR in OFDM if the number of reserved subcarriers is large enough. However, tone reservation also introduces additional redundancy for PAPR reduction, which in turn has a negative impact on the throughput of the system.

One of the main purposes of PCE2 is to keep the modulation and coding scheme of EGPRS2 unchanged. Thus, it may not be feasible to apply tone reservation to PCE2 without sacrificing the error performance.

A further solution for OFDM systems to reduce PAPR is selective mapping. The selective mapping approach improves the PAPR statistics of an OFDM signal by modifying the data part of the input of the IDFT to generate multiple random-like precoded sequence candidates. The PAPR of each precoded candidate is evaluated and the candidate with the lowest PAPR value is selected for transmission. This may yield significant PAPR reduction gains with little increase in redundancy. However, selective mapping requires multiple IDFT operations for generation of multiple representations of an input sequence of an IDFT precoder. This significantly increases the complexity of the transmitter. Also, in general, selective mapping needs transmit side information for the receiver to identify which precoded sequence is selected by the transmitter.

For PCE2, various solutions have been proposed, including soft clipping, hard clipping and symbol rotation. In soft clipping, the peaks of the IDFT precoded and filtered signals are soft clipped by adding a compensation signal to the original signal. The compensation signal is filtered through the same pulse shaping filter so the spectrum of the signal does not change. To effectively reduce PAPR, the soft clipping is done iteratively targeting the highest peak in each iteration. The number of iterations for PAPR with soft clipping may be large and in some cases greater than 10. The added compensation signals distort the original IDFT precoded signal resulting in error performance degradation.

In hard clipping, all samples exceeding a preset threshold are clipped to the threshold level. This results in non-linear distortions of the signal. Further, the power spectrum of the clipped signal is changed and high frequency components increase. Hence, in order to ensure that the spectral requirements are met whilst using the hard clipping, the threshold level used for clipping the peaks should be kept to a minimum. This would in turn have a negative impact on the actual reduction in PAPR that can be achieved. In fact, hard clipping alone cannot be used to reduce the PAPR significantly without violating the spectral requirements. Further, hard clipping generates new out-of-band frequency components that become interference to neighboring channels.

In symbol rotation, the training sequence and some of the data symbols are phase rotated with some selected phases. Blind detection is performed over the phase rotated training sequence in order to detect the rotated phase for each burst.

Separating the IDFT Calculation of Data and Pilot Symbols for PCE2

As will be appreciated by those in the art having regard to the above, the IDFT operation is a linear operation. In other words, if a=IDFT(A) and b=IDFT(B), then a+b=IDFT(A+B).

Hence, it is possible to decouple the PCE2 burst into two disjoint bursts of length N. In particular, the PCE2 burst $\{X_k\}$ may include a data burst $\{X_k^{(d)}\}$ and the training sequence (pilot) burst $\{X_k^{(p)}\}$. As seen from FIG. 2, the data and training sequence bursts are mapped on to disjoint subcarriers in the frequency domain, Hence, $\{X_k^{(d)}\}$ and $\{X_k^{(p)}\}$ are disjoint in the subcarrier space. Therefore, the IDFT precoded PCE2 burst can be treated as a linear sum of the $\{X_k^{(d)}\}$ and $\{X_k^{(p)}\}$. This is described in FIG. 5 and FIG. 6.

Referring to FIG. 5, FIG. 5 shows the data burst 500 in the frequency domain without the training sequence symbols. i.e. the positions of the subcarriers carrying data symbols 512 are filled with appropriate data symbols and the positions of the subcarriers carrying the training sequence symbols 510 are set to zero. This is the sequence that represents $\{X_k^{(d)}\}$ above.

In similar fashion, the frequency domain representation of training sequence burst 600 is as shown in FIG. 6. In this case, the positions of the subcarriers carrying training sequence symbols 610 are populated with the appropriate pilot symbols and the positions of the subcarriers carrying data symbols 612 are filled with zeros. This is the sequence that would be representative of the sequence $\{X_k^{(p)}\}$ above.

From the above, it is evident that $\{X_k\}=\{X_k^{(d)}+X_k^{(p)}\}$, k=0, ..., N−1.

The PCE2 burst is obtained first by calculating the IDFT of the sequence $\{X_k\}$ which is given as below:

$$x_n = \frac{1}{\sqrt{N}} \sum_{k=0}^{N-1} X_k e^{j\frac{2\pi kn}{N}} = \frac{1}{\sqrt{N}} \sum_{k=0}^{N-1} X_k^{(d)} e^{j\frac{2\pi kn}{N}} + \frac{1}{\sqrt{N}} \sum_{k=0}^{N-1} X_k^{(p)} e^{j\frac{2\pi kn}{N}} = x_n^{(d)} + x_n^{(p)}, \quad (3)$$

$$n = 0, \ldots, N-1.$$

where $x_n^{(d)}$ and $x_n^{(p)}$ are the IDFTs of the data burst $\{X_k^{(d)}\}$ and the training sequence burst $\{X_k^{(p)}\}$ associated with the burst $\{X_k\}$, respectively.

Based on Formula 3 above, the following observations about IDFT calculations may be made.

Given a data burst $\{X_k^{(d)}\}$, an IDFT of the $\{X_k\}$, which is the burst $x_n$ can be modified by choosing a given pilot burst $\{X_k^{(p)}\}$.

Further, the training sequence (pilot) burst $\{X_k^{(p)}\}$ may have multiple variants $\{X_{m,k}^{(p)}\}$ (0≤m<M) known by both the transmitter and receiver. Hence, any particular training sequence among the m possible variants can be chosen such that the PAPR value of $\{x_n\}$ is minimized.

Also, the design of $\{X_{m,k}^{(p)}\}$ may be optimized for both PAPR reduction at the transmitter and better channel estimation at the receiver.

As the IDFTs of $\{X_{m,k}^{(p)}\}$, $\{x_{m,n}^{(p)}\}$ can be pre-calculated and stored at the transmitter. They are independent of each data burst. As for the normal PCE2, the method and systems as described below only require one IDFT calculation.

As will be appreciated, CP insertion is a linear operation and the CP is a cyclic shift of a small portion of the original signal.

A further observation is that the transmit pulse shaping filtering being a convolution operation, is a linear operation.

Figure 7:
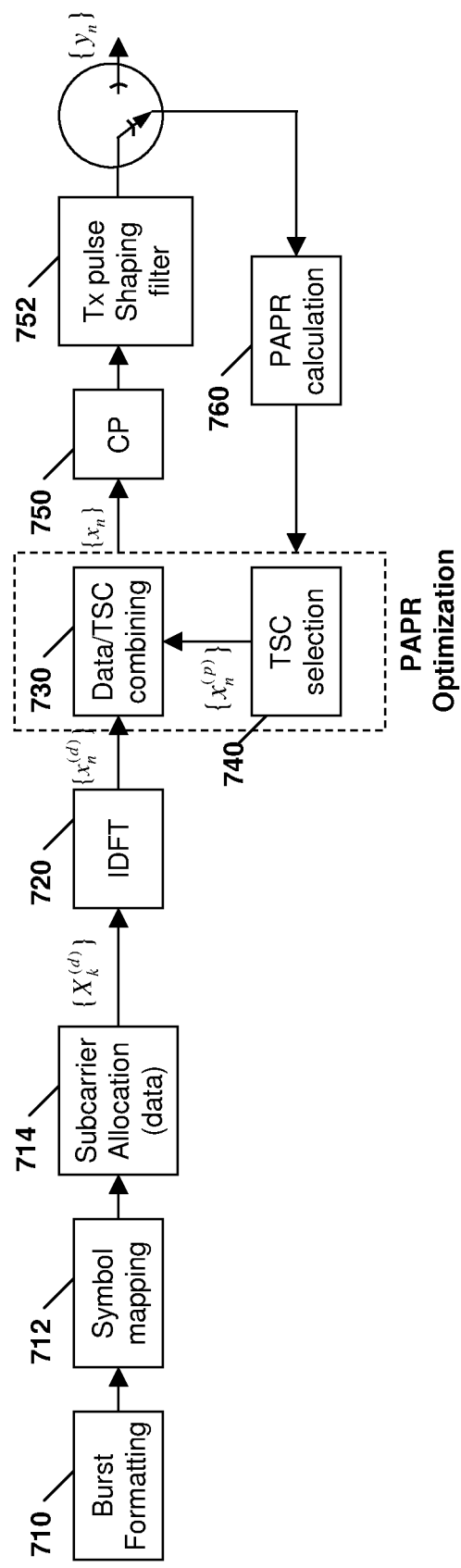
FIG. 7 is a block diagram illustrating a method for using a plurality of training sequences to reduce PAPR.

Based on the above observations, in one embodiment a new method for PAPR reduction is provided using multiple training sequences. Reference is now made to FIG. 7, which illustrates a block diagram of a PCE2 transmitter with multipilot-sequence-aided (MPSA) PAPR reduction. In particular, the process of FIG. 7 starts at block 710 in which burst formatting is performed.

The process then proceeds to block 712 in which symbol mapping is performed.

The process then proceeds to block 714, which provides for subcarrier allocation for the data portion of the signal.

The data portion of the signal is then processed through the IDFT block 720. The data portion then proceeds to a data and training sequence combining block 730. Data and training sequence combining block 730 further includes an input from a training sequence selection block 740. Thus, data and training sequence combining block 730 produces a burst with both pilot and data portions by adding the IDFT part of data symbols with the IDFT part of the training sequence symbols.

From data and training sequence combining block 730, the process proceeds to block 750 in which a cyclic prefix is added. The process then proceeds to a transmit pulse shaping filter 752 which produces the output. The output can then be checked to determine the PAPR, which is done at PAPR calculation block 760. If the output has a PAPR meets the requirements of the transmitter, then the burst is transmitted. Otherwise the process can proceed back to selection block 740 in which a different training sequence is selected.

Thus, the process of FIG. 7 can continue until a training sequence that meets a predefined criteria is found or until the lowest PAPR is achieved once all the possible pilots have been tested through in the blocks of 730 and 740.

Figure 8:
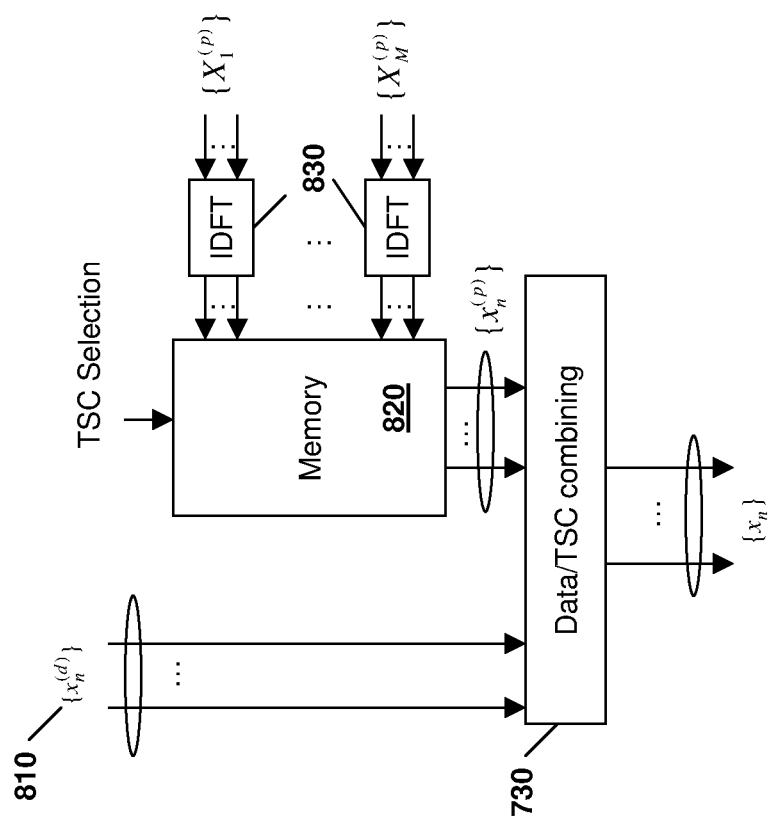
FIG. 8 is a block diagram of a transmitter configured to use a plurality of training sequences to reduce PAPR.

Referring to FIG. 8, FIG. 8 shows the details of the PAPR optimization. The data and training sequence combining block 730 from FIG. 7 is provided with inputs, including the data signal 810, which is the same signal that is produced by IDFT block 720. Further, data and training sequence combining block 730 includes a training sequence signal input which is the same as the output from the training sequence selection block 740 of FIG. 7.

The training sequence selection is based on the conversions of the training sequences being stored in a memory 820. The memory 820 stores the IDFT precoded versions of all of the possible training sequence signals. This is shown utilizing multiple IDFT blocks 830 in the example of FIG. 8.

The IDFTs of multiple length-N training sequence bursts $\{X_{m,k}^{(p)}\}$, $\{X_{m,n}^{(p)}\}$, ($0 \leq m < M$) may be pre-calculated and pre-stored in memory 830 at the transmitter. The IDFT of a training sequence burst depends only on the given training sequence and the pilot burst structure 600 shown in FIG. 6 above. After symbol mapping, as described above with regard to block 712 of FIG. 7, $N^{(d)}$ data symbols are arranged to generate a data burst $\{X_k^{(d)}\}$ of length-N. The burst $\{X_n^{(d)}\}$ is obtained by applying an N-point IDFT to $\{X_k^{(d)}\}$. The $\{X_n^{(d)}\}$ is added to each of the pre-stored sequences $\{X_{m,n}^{(p)}\}$ ($0 \leq m < M$) of length-N through $x_n^{(d)} + X_{m,n}^{(p)}$, $n=0, \ldots, N-1$.

Reducing Computation

From the observations above, specifically dealing with the transmit pulse shaping filtering being a linear operation, those skilled in the art having regard to the present disclosure may note that the cyclic prefix operation, other blocks in the transmitter of a PCE2 encoder starting from the IDFT operation are all linear. Hence, an alternative transmitter architecture is provided, as shown below with regards to FIG. 9.

Figure 9:
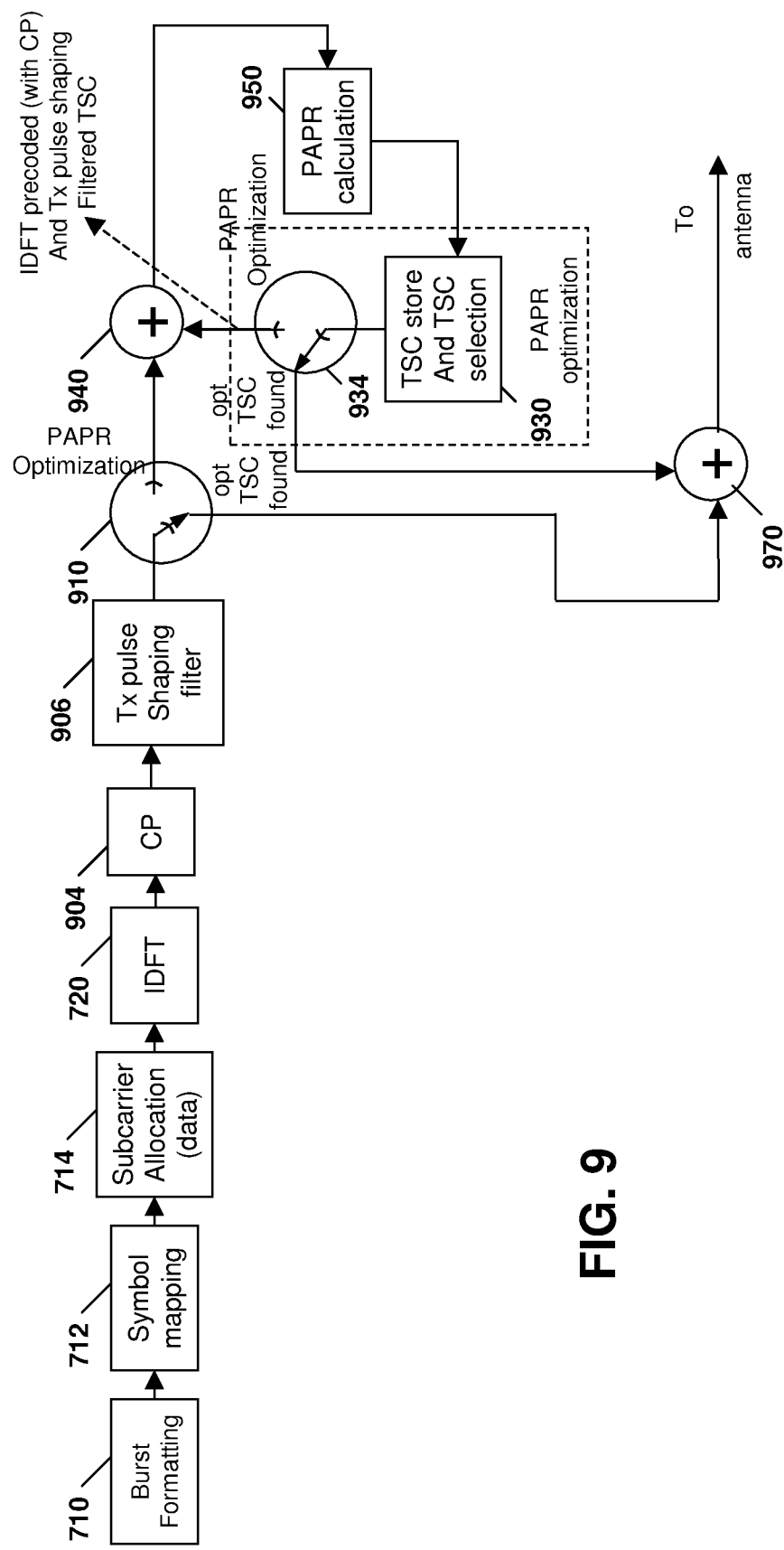
FIG. 9 is a block diagram illustrating a further method for using a plurality of training sequences to reduce PAPR.

In FIG. 9, a similar structure to that of FIG. 7 above is provided with regard to burst formatting block 710, symbol mapping block 712, subcarrier allocation block 714 and IDFT block 720.

The data burst is then provided with a cyclic prefix at block 904 and is filtered with a transmit pulse shaping filter 906.

A switch 910 is introduced in which the output of transmit pulse shaping block 906 proceeds to an adder 940 during PAPR optimization. The output is added to a training sequence signal from the TSC store and TSC selection block 930. As seen, switch 934 is provided for the output from training sequence code (TSC) selection and TSC store. From FIG. 9, TSC store 930 provides a Tx pulse shaped filtered IDFT version, with a cyclic prefix, to block 940.

During the PAPR optimization, switches 910 and 934 are in PAPR optimization position. The output of TSC store and TSC selection block 930 proceeds to the adder 940 and is added to the data portion from the transmit pulse shaping filter block 906. The output of the adder 940 is then provided to PAPR calculation block 950, which calculates the PAPR value.

Based on the PAPR calculation 950, a decision can be made whether an optimal or a good enough PAPR has been achieved for the burst and if so, the switches 910 and 934 are switched to the opt TSC found position.

After the switches are switched, the output of transmit pulse shaping filter 906 is provided to adder 970 along with the selected training sequence from block 930.

The burst is then sent to an antenna.

One benefit of the architecture of FIG. 9 is that the transmitter does not need to perform the TX pulse shaping filtering at each and every candidate training sequence. The transmission pulse shaping filtering is not trivial and is typically requires significant computational complexity to implement.

According to FIG. 9, instead of doing the transmit pulse shaping filtering in an over-sampling domain "M" number of times, where M is the number of TSC candidates, the transmit pulse shaping filtering only needs to be done once. Namely, it needs to be done once at block 906.

Selection of Training Sequences

Various options exist for the selection of training sequences for MPSA PAPR reduction. As described above, to reduce the PAPR, multiple training sequence candidates are required. The training sequence which results in the lowest PAPR is selected.

Circular-Shifted Pilot Sequences for MPSA PAPR Reduction

In a first embodiment, the training sequences used in EGPRS2 are well-designed with good autocorrelation properties. An EGPRS2 training sequence and its circular-shifted versions can be considered to generate multiple training sequence bursts. Such an embodiment may be referred to as a circular shifted pilot sequence (CSPS).

In accordance with the CSPS embodiment, the selection of the pilot signals may ease implementation since not all sequences need to be stored at the receiver. Only a simple counter is used to distinguish the offset of a pilot sequence. However, the IDFTs related to the multiple training sequences of the first embodiment should be pre-calculated and pre-stored in one implementation.

The use of such first embodiment selection may produce a reduction in the peak-to-average power ratio as shown below.

To demonstrate the above, let $\{P_1, \ldots, P_{26}\}$ be the training sequence to be used in the initial burst and let $\{P_{(0+mJ) \bmod 26+1}, \ldots, P_{(25+mJ) \bmod 26+1}\}$ be the mth-shifted version of $\{P_1, \ldots, P_{26}\}$ ($0 \leq m < M$) where J is the number of pilot symbols representing one shifting step (assume that each shifting step is fixed). Mapping multiple training sequences $\{P_{(0+mJ) \bmod 26+1}, \ldots, P_{(25+mJ) \bmod 26+1}\}$ ($0 \leq m < M$) into FIG. 3 yields multiple training sequence bursts.

Figure 10:
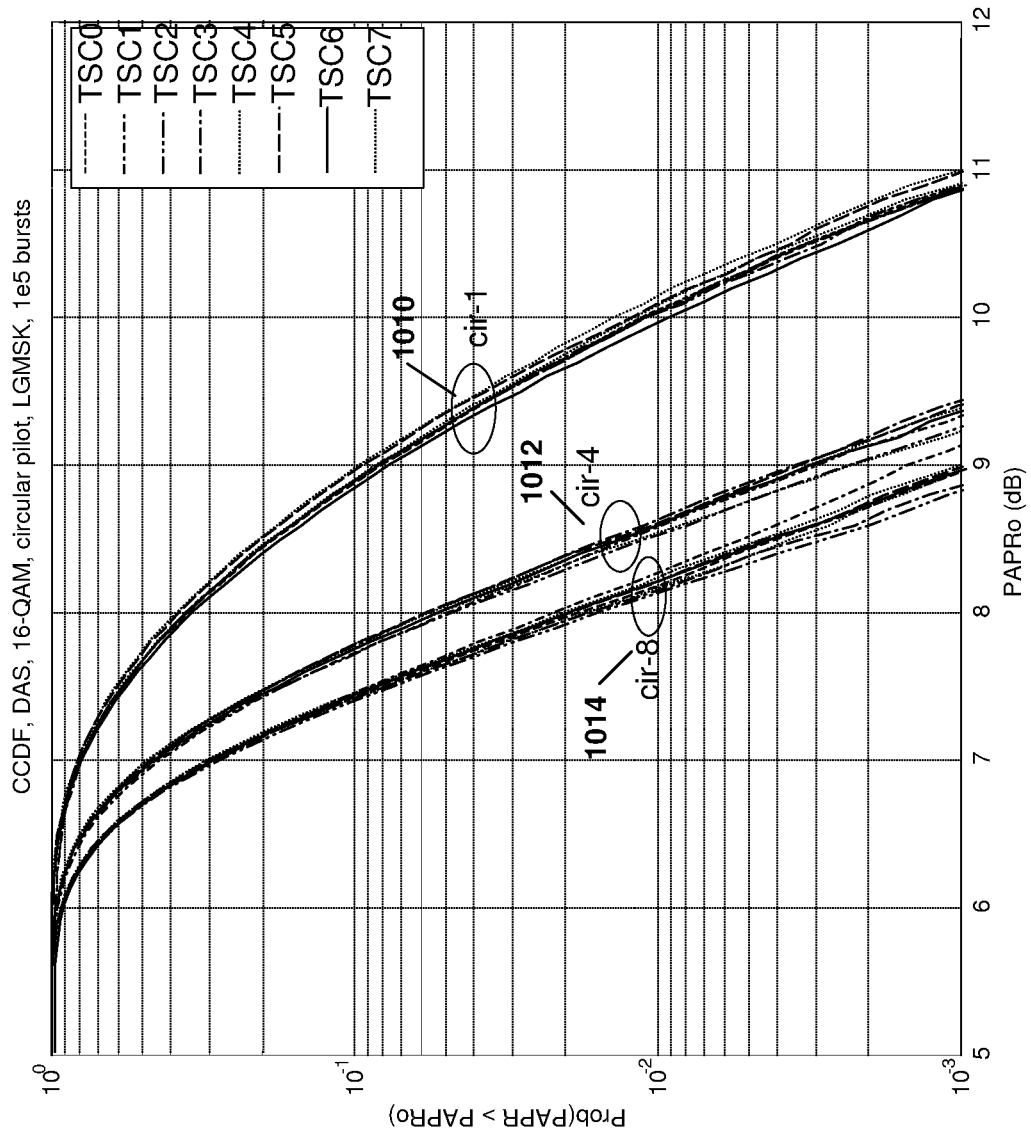
FIG. 10 is a graph showing a complementary cumulative density function of PAPR using multiple circular-shifted training sequences for PAPR reduction for precoded DAS with 16-QAM modulation.

Reference is now made to FIG. 10, which shows a CCDF of PAPR using multiple circular-shifted pilot sequences for PAPR reduction for precoded DAS with 16-QAM modulation. According to the plot of FIG. 10, all eight training sequences for DAS with 16-QAM modulation are evaluated. The "CIR-1" block 1010 indicates one circular training sequence. Similarly, "CIR-4" block 1012 indicates four circular pilot sequences and "CIR-8" block 1014 indicates eight circular training sequences. The plot of FIG. 10 shows a given number of CSPS, the PAPR performance for all eight training sequences is similar. Further, the larger the number of circular training sequences employed, the lower the PAPR at a probability of $10^{-3}$.

Referring to FIGS. 11 to 14, these figures show the CCDF of PAPR of 8-PSK, 16-QAM, 32-QAM and 64-QAM modulated PCE2-A signals using the CSPS PAPR reduction approach, respectively. TSC 3 of each modulation type is used as the initial training sequence without an offset. The PAPRs of the PCE2 signals using 1, 4, 8, and 16 circular shifted pilot (TSC) sequences are evaluated at the probability of $10^{-4}$.

Figure 11:
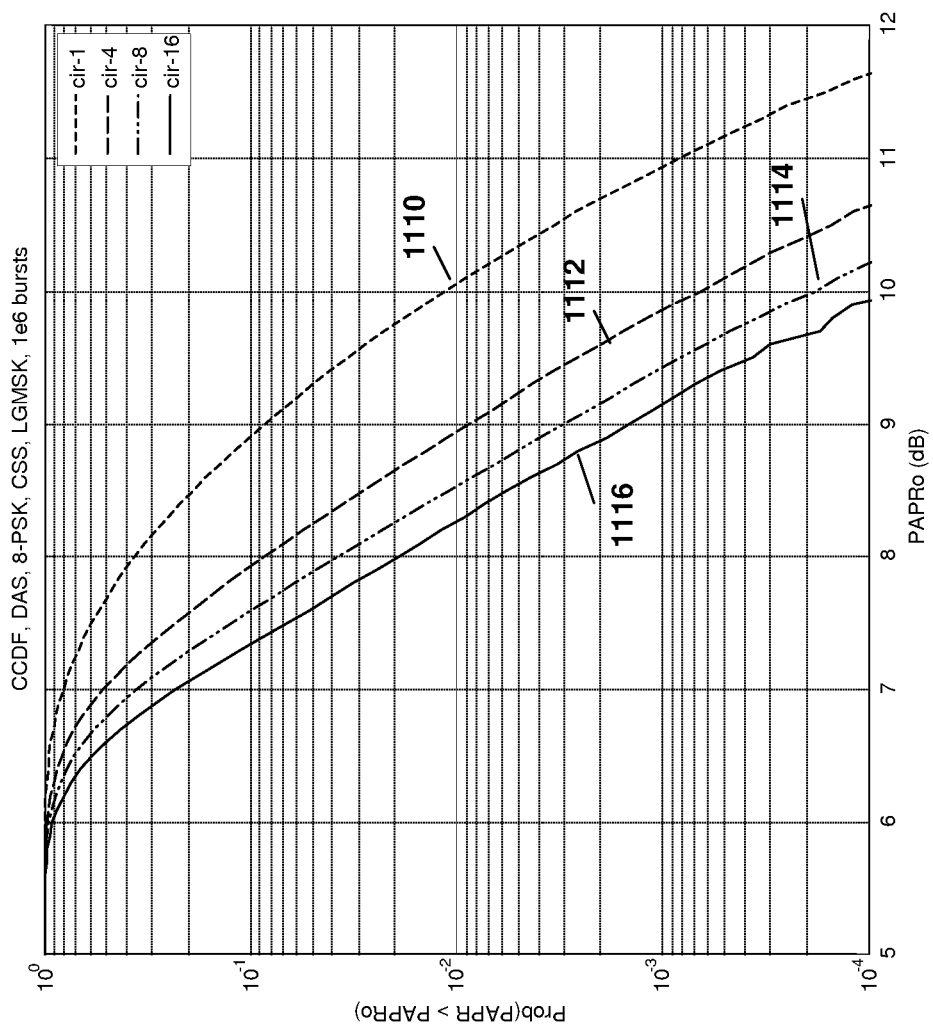
FIG. 11 is a graph showing the complementary cumulative density function of PAPR of an 8-PSK modulated PCE2-A signal.

In particular, in FIG. 11 shows the CCDF of PAPR of 8-PSK modulated PCE2-A signal. Plot 1110 shows the PAPR with 1 circular shifted pilot sequence. Plot 1112 shows the PAPR with 4 circular shifted pilot sequences. Plot 1114 shows the PAPR with 8 circular shifted pilot sequences. Plot 1116 shows the PAPR with 16 circular shifted pilot sequences.

Figure 12:
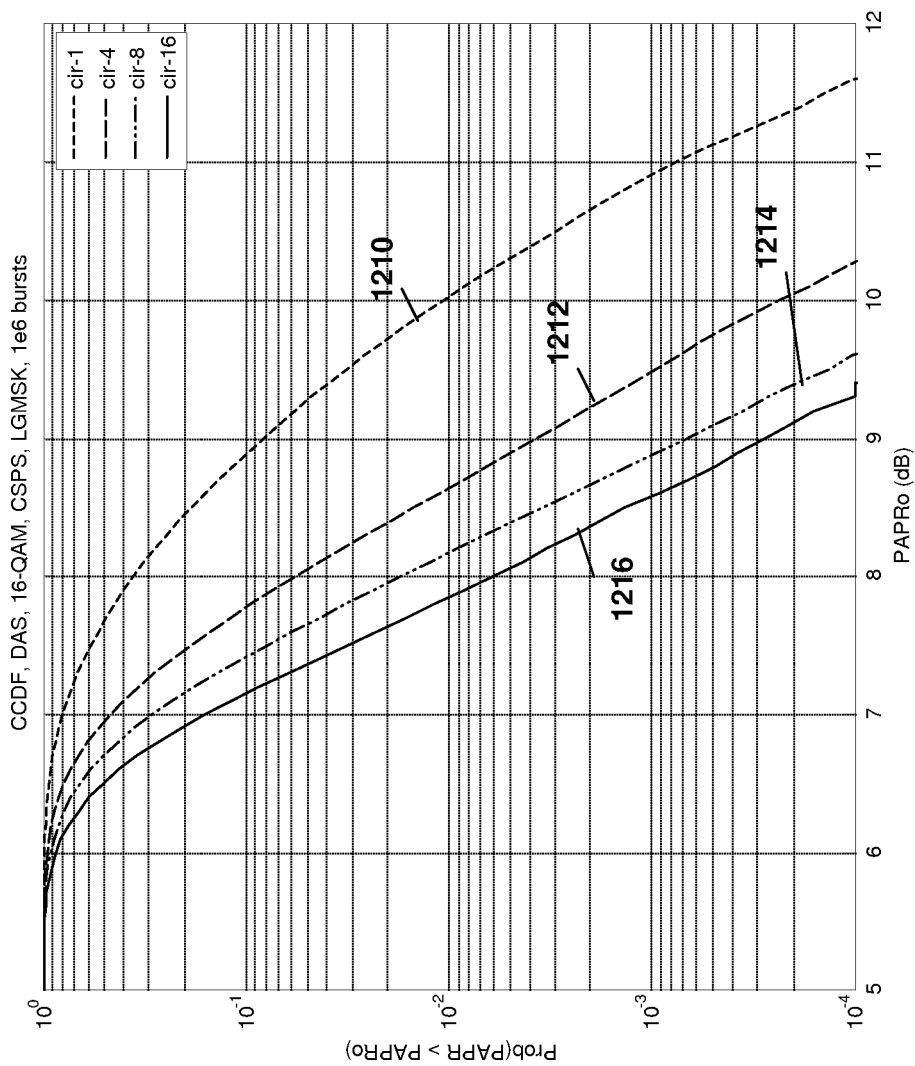
FIG. 12 is a graph showing the complementary cumulative density function of PAPR of a 16-QAM modulated PCE2-A signal.

FIG. 12 shows the CCDF of PAPR of 16-QAM modulated PCE2-A signal. Plot 1210 shows the PAPR with 1 circular shifted pilot sequence. Plot 1212 shows the PAPR with 4 circular shifted pilot sequences. Plot 1214 shows the PAPR with 8 circular shifted pilot sequences. Plot 1216 shows the PAPR with 16 circular shifted pilot sequences.

Figure 13:
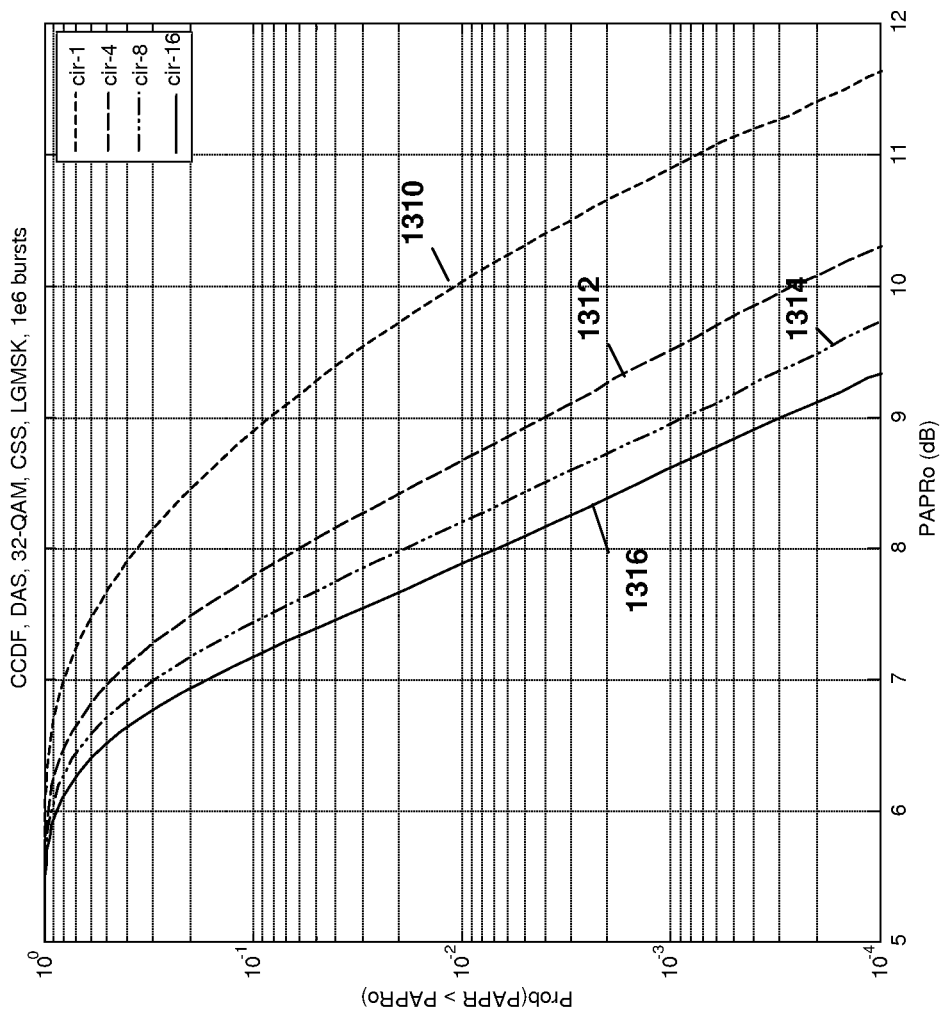
FIG. 13 is a graph showing the complementary cumulative density function of PAPR of a 32-QAM modulated PCE2-A signal.

FIG. 13 shows the CCDF of PAPR of 32-QAM modulated PCE2-A signal. Plot 1310 shows the PAPR with 1 circular shifted pilot sequence. Plot 1312 shows the PAPR with 4 circular shifted pilot sequences. Plot 1314 shows the PAPR with 8 circular shifted pilot sequences. Plot 1316 shows the PAPR with 16 circular shifted pilot sequences.

Figure 14:
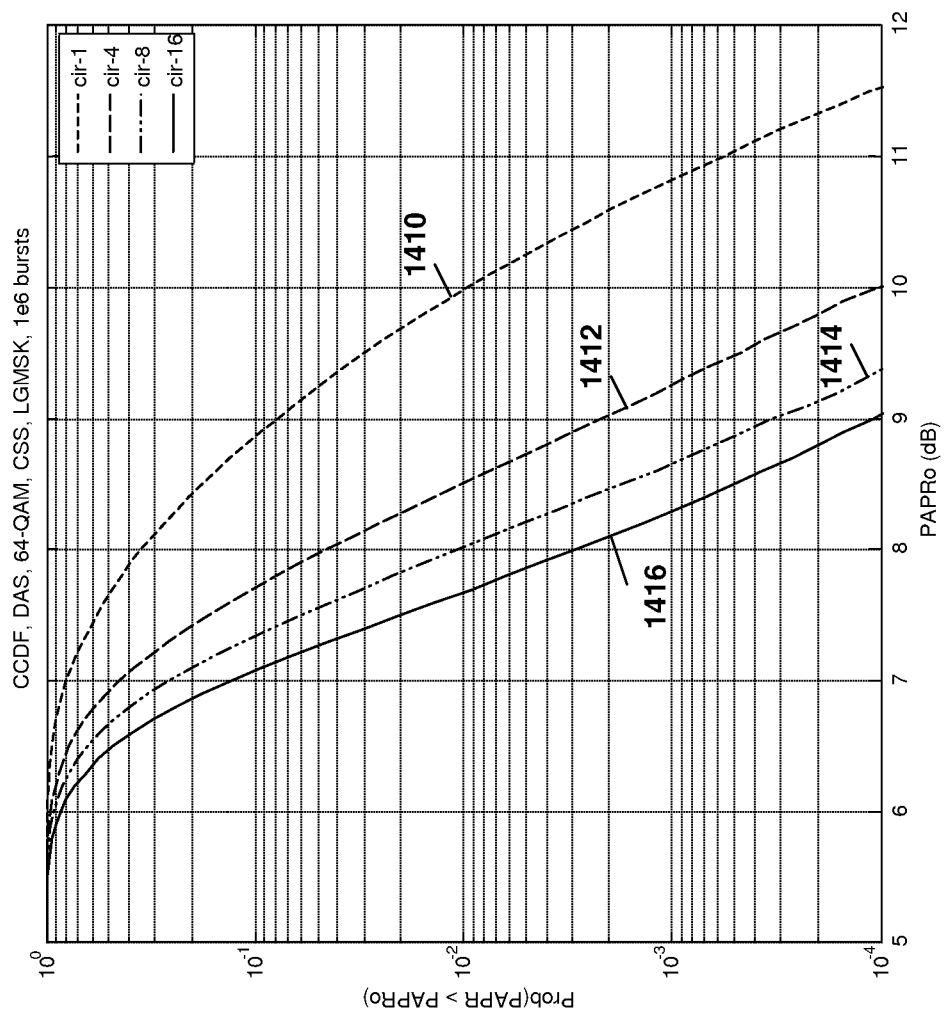
FIG. 14 is a graph showing the complementary cumulative density function of PAPR of a 64-QAM modulated PCE2-A signal.

FIG. 14 shows the CCDF of PAPR of 64-QAM modulated PCE2-A signal. Plot 1410 shows the PAPR with 1 circular shifted pilot sequence. Plot 1412 shows the PAPR with 4 circular shifted pilot sequences. Plot 1414 shows the PAPR with 8 circular shifted pilot sequences. Plot 1416 shows the PAPR with 16 circular shifted pilot sequences.

The results from the plots of FIGS. 11 to 14 are shown below in Table 1.

TABLE 1

Comparison of PAPR at $10^{-4}$ of PCE2 signals using CSPS (in dB)

| Modulation | PCE2 PAPR (cir-1) | PCE2 PAPR (cir-4) | PCE2 PAPR (cir-8) | PCE2 PAPR (cir-16) |
|---|---|---|---|---|
| 8-PSK | 11.7 | 10.7 | 10.2 | 9.9 |
| 16-QAM | 11.6 | 10.3 | 9.6 | 9.3 |
| 32-QAM | 11.6 | 10.3 | 9.7 | 9.3 |
| 64-QAM | 11.5 | 10.0 | 9.4 | 9.0 |

From Table 1 above, PAPR reduction gains with the method and systems of the present disclosure depend on how many circular pilot sequences are used and are independent of the modulation type. With four circular pilot sequences, the PAPR value at a probability of $10^{4}$ can be reduced by 1 to 1.5 dB compared to the PAPR of the normal PCE2 without PAPR reduction. With eight circular pilot sequences, the PAPR value at the probability of $10^{4}$ can be reduced between 1.5 and 2.1 dB. With sixteen circular pilot sequences, the PAPR value at the probability of $10^{4}$ can be reduced between 1.8 and 2.5 dB. Further PAPR reduction can be achieved by employing more circular pilot sequences.

As will be appreciated by those skilled in the art having regard to the above, the more circular-shifted TSCs, the better the PAPR performance.

Circular-Shifted IDFT of Pilot Sequences (CSIPS) for MPSA PAPR Reduction

Alternatively, to reduce the complexity of the transmitter, only one IDFT of the initial training sequence bursts is generated and stored in the transmitter. The IDFTs of the other training sequence bursts can be simply obtained by circular-shifting the IDFT of the initial pilot (TSC) burst. Such multiple pilot bursts are related to each other with linear phase shifting.

To demonstrate the above, let $\{x_{0,n}^{(p)}\}$ be the IDFT of the initial training sequence burst $\{X_{0,k}^{(p)}\}$ and let $\{x_{q,n}^{(p)}\}$ be the qth-shifted version of $\{x_{0,n}^{(p)}\}$ with $x_{q,n}^{(p)} = x_{0,(n+qI) \bmod N}^{(p)}$ ($0 \leq q < Q$, $0 \leq n < N$) where I is the number of symbols representing one shifting step (assume that each shifting step is fixed). Therefore, the training sequence burst $\{X_{q,k}^{(p)}\}$ can be represented as:

$$X_{q,k}^{(p)} = \frac{1}{\sqrt{N}} \sum_{k=0}^{N-1} x_{q,n}^{(p)} e^{-j\frac{2\pi kn}{N}} = \frac{1}{\sqrt{N}} \sum_{k=0}^{N-1} x_{0,(n+qI) \bmod N}^{(p)} \cdot e^{-j\frac{2\pi kn}{N}} = X_{0,k}^{(p)} \cdot e^{j\frac{2\pi kqI}{N}}. \quad (4)$$

As shown by Equation 4 above, in CSIPS the rotated phase value is a linear function of k.

Referring to FIGS. 15 to 18, these figures show the CCDF of PAPR of 8-PSK, 16-QAM, 32-QAM and 64-QAM modulated PCE2-A signals using circular-shifted IDFTs of TSC bursts respectively. TSC 3 of each modulation type is used as the initial training sequence. The PAPRs of the PCE2 signals using 1, 4, 8, and 16 circular shifted IDFTs of pilot sequences are evaluated at the probability of $10^{-4}$.

Figure 15:
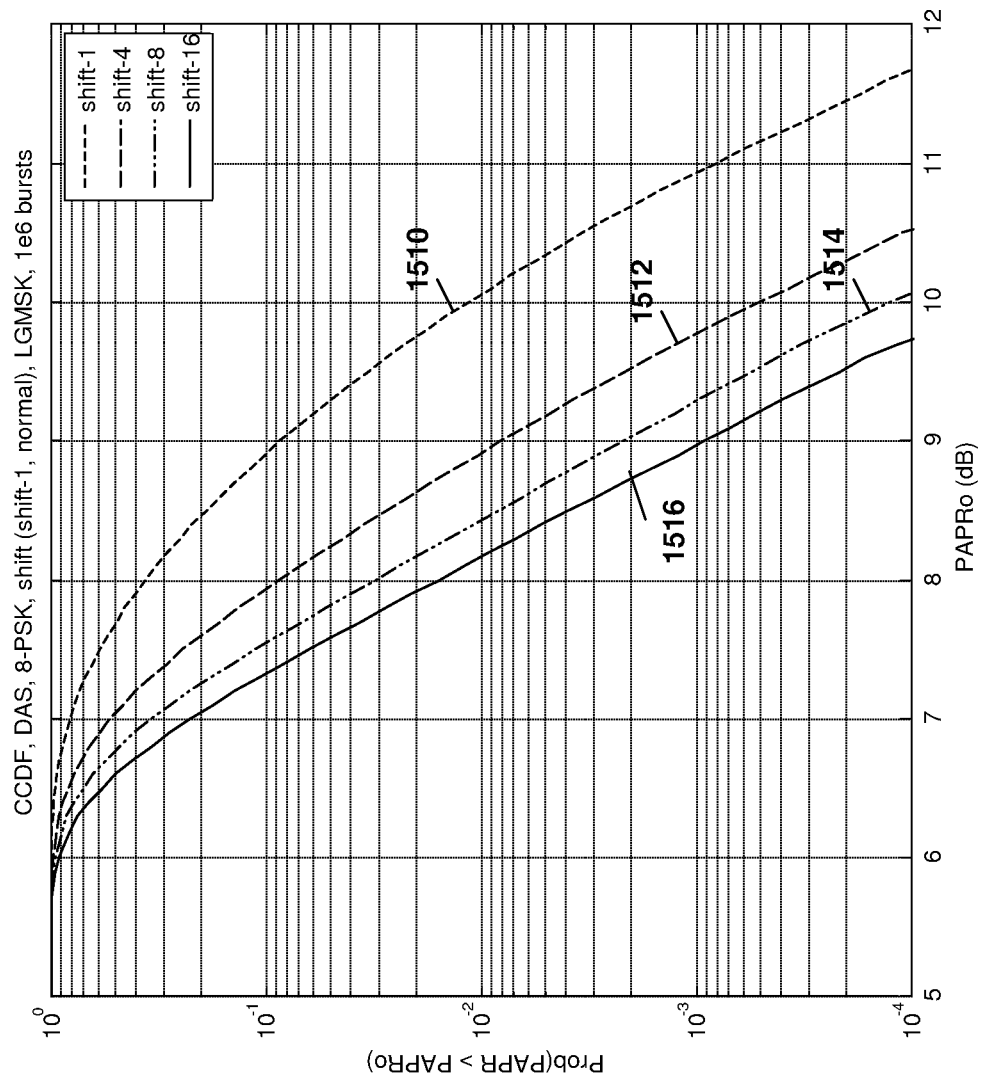
FIG. 15 is a graph showing the complementary cumulative density function of PAPR of an 8-PSK modulated PCE2-A signal using circular-shifted IDFTs of pilot bursts.

In particular, in FIG. 15 shows the CCDF of PAPR of 8-PSK modulated PCE2-A signal using CSIPS. Plot 1510 shows the PAPR with 1 circular shifted IDFT of the pilot sequence. Plot 1512 shows the PAPR with 4 circular shifted IDFTs of the pilot sequence. Plot 1514 shows the PAPR with 8 circular shifted IDFTs of the pilot sequence. Plot 1516 shows the PAPR with 16 circular shifted IDFTs of the pilot sequence.

Figure 16:
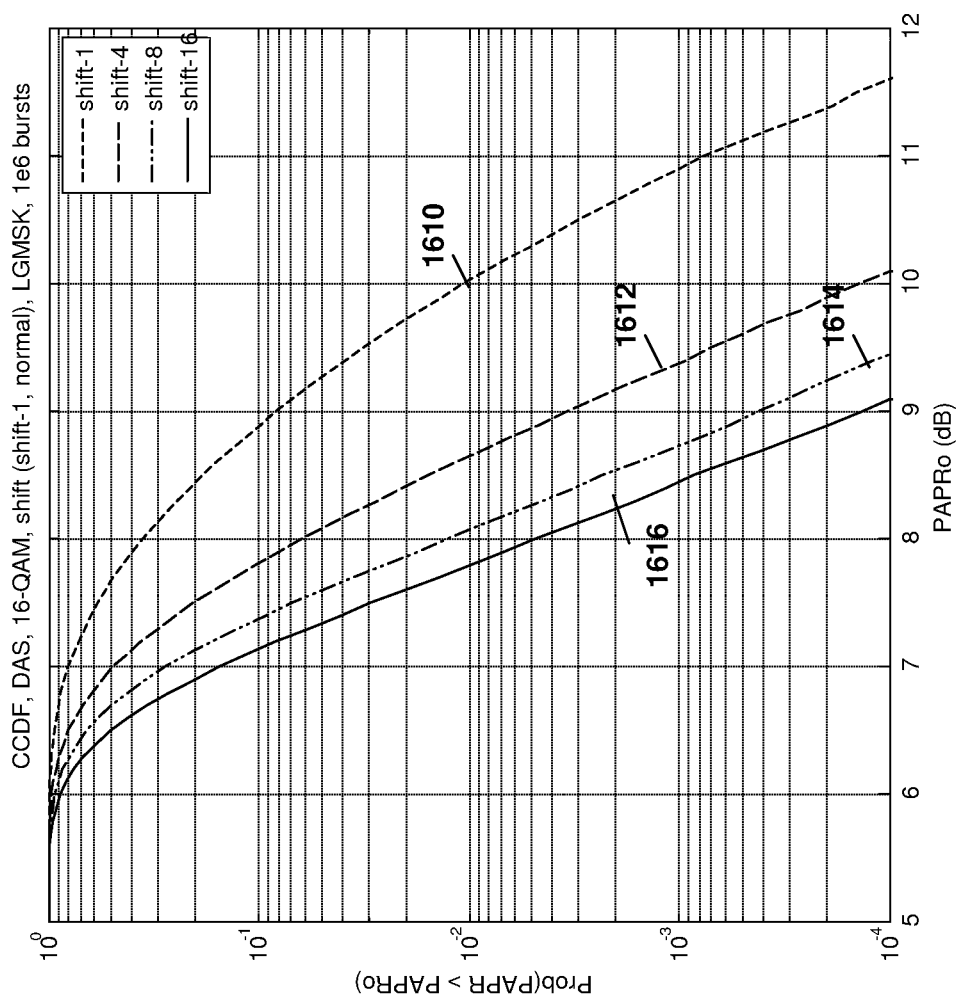
FIG. 16 is a graph showing the complementary cumulative density function of PAPR of a 16-QAM modulated PCE2-A signal using circular-shifted IDFTs of pilot bursts.

FIG. 16 shows the CCDF of PAPR of 16-QAM modulated PCE2-A signal using CSIPS. Plot 1610 shows the PAPR with 1 circular shifted IDFT of the pilot sequence. Plot 1612 shows the PAPR with 4 circular shifted IDFTs of the pilot sequence. Plot 1614 shows the PAPR with 8 circular shifted IDFTs of the pilot sequence. Plot 1516 shows the PAPR with 16 circular shifted IDFTs of the pilot sequence.

Figure 17:
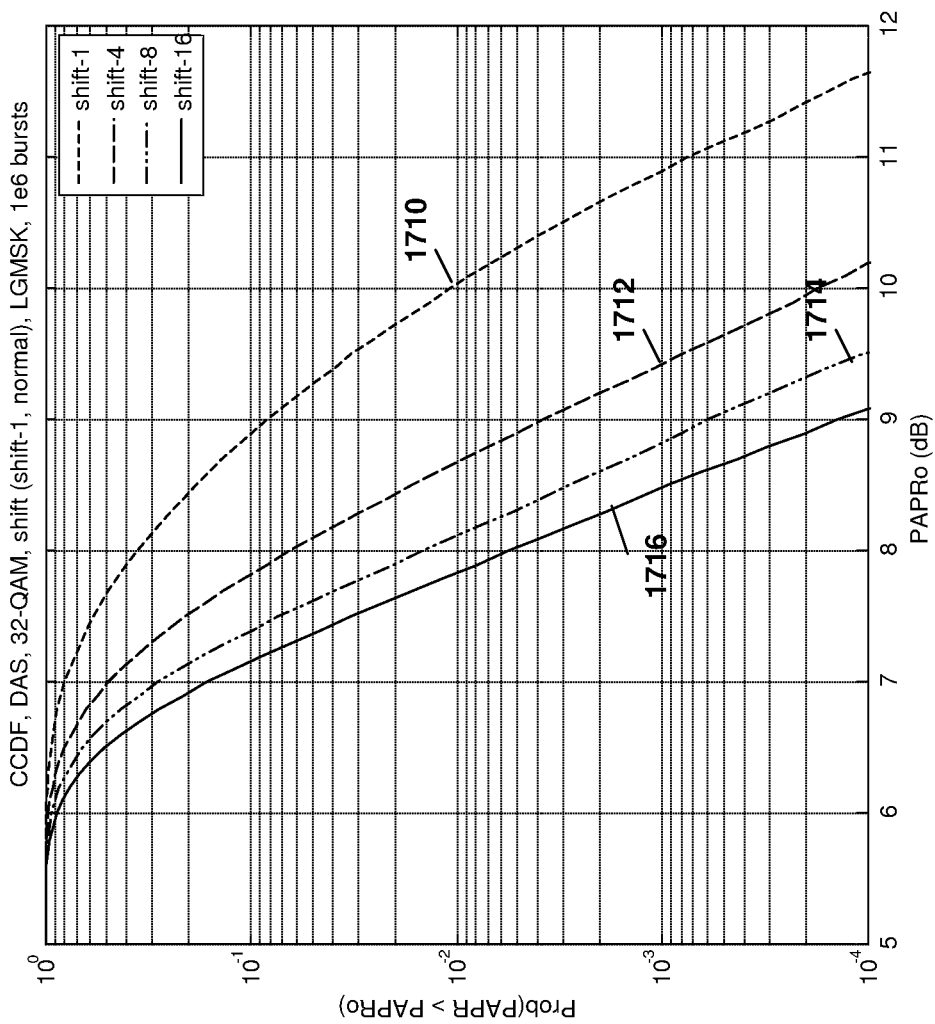
FIG. 17 is a graph showing the complementary cumulative density function of PAPR of a 32-QAM modulated PCE2-A signal using circular-shifted IDFTs of pilot bursts.

FIG. 17 shows the CCDF of PAPR of 32-QAM modulated PCE2-A signal using CSIPS. Plot 1710 shows the PAPR with 1 circular shifted IDFT of the pilot sequence. Plot 1712 shows the PAPR with 4 circular shifted IDFTs of the pilot sequence. Plot 1714 shows the PAPR with 8 circular shifted IDFTs of the pilot sequence. Plot 1716 shows the PAPR with 16 circular shifted IDFTs of the pilot sequence.

Figure 18:
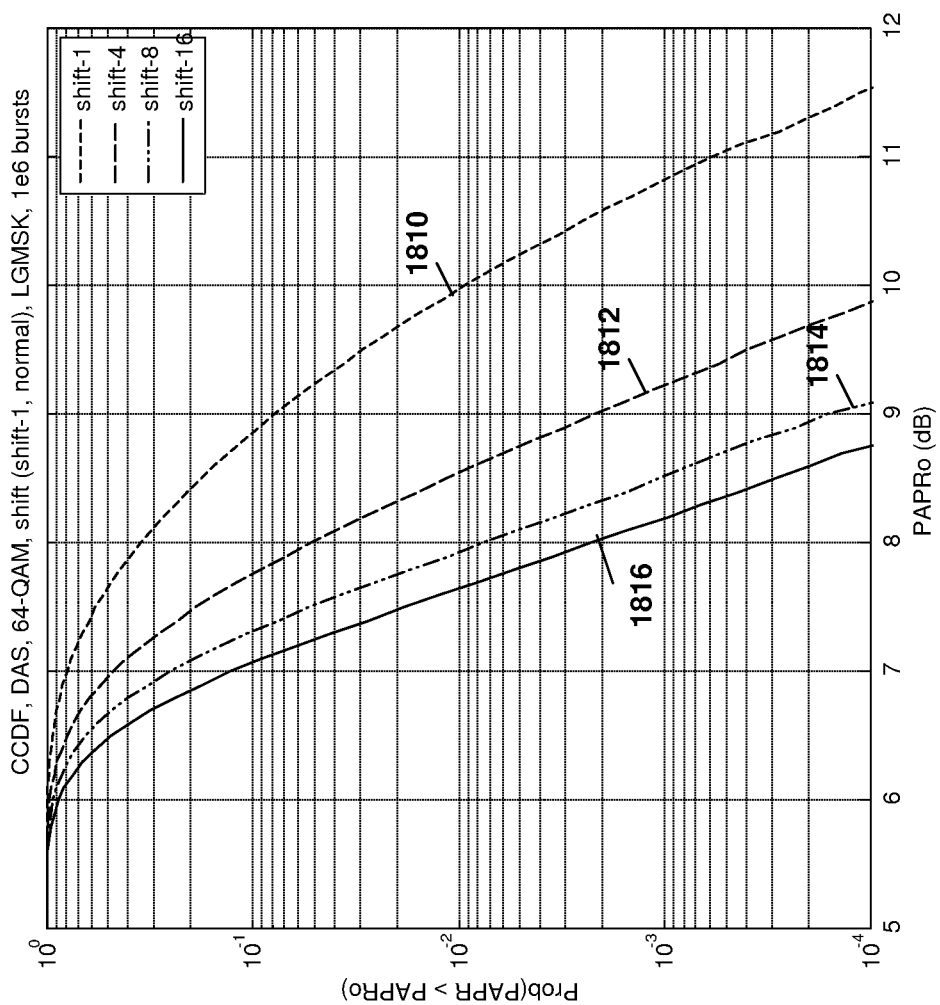
FIG. 18 is a graph showing the complementary cumulative density function of PAPR of a 64-QAM modulated PCE2-A signal using circular-shifted IDFTs of pilot bursts.

FIG. 18 shows the CCDF of PAPR of 64-QAM modulated PCE2-A signal using CSIPS. Plot 1810 shows the PAPR with 1 circular shifted IDFT of the pilot sequence. Plot 1512 shows the PAPR with 4 circular shifted IDFTs of the pilot sequence. Plot 1814 shows the PAPR with 8 circular shifted IDFTs of the pilot sequence. Plot 1816 shows the PAPR with 16 circular shifted IDFTs of the pilot sequence.

The results from the plots of FIGS. 15 to 18 are shown below in Table 2.

TABLE 2

Comparison of PAPR at $10^{-4}$ of PCE2 signals using CSIPS

| Modulation | PCE2 PAPR (shift-1) | PCE2 PAPR (shift-4) | PCE2 PAPR (shift-8) | PCE2 PAPR (shift-16) |
|---|---|---|---|---|
| 8-PSK | 11.7 | 10.5 | 10.1 | 9.7 |
| 16-QAM | 11.6 | 10.1 | 9.5 | 9.1 |
| 32-QAM | 11.6 | 10.2 | 9.5 | 9.1 |
| 64-QAM | 11.5 | 9.9 | 9.1 | 8.8 |

Table 2 shows that with 4 circular-shifted IDFTs of pilot sequences, compared to the PAPR of the normal PCE2 without PAPR reduction, the PAPR value at the probability of $10^{-4}$ can be reduced between 1.2~1.6 dB; while with 8 circular pilot sequences, the PAPR value at the probability of $10^{-4}$ can be reduced between 1.6~2.4 dB. With 16 circular pilot sequences, the PAPR value at the probability of $10^{-4}$ can be reduced between 2.0 and 2.7 dB. Further PAPR reduction can be achieved by employing more circular-shifted versions of the IDFTs of the initial pilot sequence.

As will be appreciated by those in the art, other methods for determining pilot sequences could also be used. In one embodiment, a receiver and transmitter may simply store a plurality of predetermined pilot sequences and chose the one that provides the optimal PAPR, for example.

The above therefore provides a system and method for PAPR reduction through multiple pilot signals. The complexity of the methods can be reduced based on above. For example, to reduce IDFT calculations for each PCE2 burst, the IDFTs of all training sequences bursts may be pre-calculated and stored at the transmitter. Further to reduce the number of filtering operations, the transmit pulse shaping filtered versions of the IDFT precoded pilot sequences can also be precalculated and stored. All variants of training sequences are also known by the receiver.

As described above, the IDFT of a PCE2 burst is equivalent to the addition of the IDFT of the data burst and the IDFT of a pilot burst. In MPSA PAPR reduction, at the transmitter only one N-point IDFT is conducted per PCE2 burst. The PAPR of a PCE2 burst is optimized by evaluating each combined sequence $\{x_n^{(d)} + x_{m,n}^{(p)}\}$ ($1 \leq m \leq M$) (N additions and N−1 comparisons) iteratively. The maximum number of iterations for PAPR optimizations equals M. Further, to reduce the complexity in the PAPR optimization process, it is not necessary that the iterative combining $x_n^{(d)} + x_{m,n}^{(p)}$ runs through all M pilot sequence candidates. The process can be early-terminated if the PAPR of the resulted $\{X_n\}$ is smaller than a pre-defined value.

Receiver

In MPSA PAPR reduction of PCE2 signals, the receiver should have knowledge on the use of pilot sequence at the transmitter in order to proceed with channel estimation and demodulation/decoding appropriately. Such information can be obtained in receiver by blind detection in one embodiment. An example of joint blind detection of the training sequence and the modulation is provided below.

Figure 19:
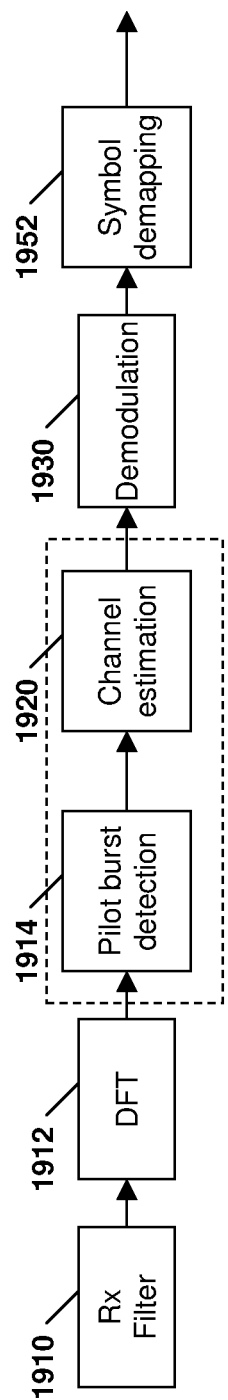
FIG. 19 is a block diagram of an exemplary receiver.

Reference is now made to FIG. 19. At a receiver, after receiver filtering at block 1910 a single N-point discrete Fourier transform (DFT) operation is performed at block 1912.

The training sequence used at the transmitter may be detected jointly with the modulation blind detection at block 1914 and, if necessary, with channel estimation at block 1920. Similar to the modulation detection in a receiver, the training sequence used in a burst can be blindly detected by a metrics of correlation, least-square and others, in conjunction with or independently of the channel estimation.

As the modulation detection is a required functional block in the current PCE2, the two blind detectors (one for modulation detection; the other for detection of multiple training sequences for PAPR reduction) can be combined. One way to implement the joint detection is to conceptually devise Q groups of training sequences, with each group comprising M training sequences. The Q corresponds to the number of modulations used in PCE2 and M is the number of training sequences required by the targeting PAPR reduction. One best training sequence is detected amongst all the QM sequences and the group it belongs to is the detected modulation. The QM pilot sequences can be generated by a number of QM cyclic shifts of the original training sequence, as described above.

Based on the training burst detection and estimated channel information, the received signals can be demodulated in block 1930.

The output of demodulation block 1930 is then symbol de-mapped at block 1940 to provide the data to the device.

Based on the disclosure above, multi-pilot-sequence-aided (MPSA) PAPR reduction employs the linearity of IDFT. Therefore, a data burst and a training sequence burst can perform an IDFT operation independently. Multiple versions of an IDFT precoded sequence can be generated with only one IDFT (the IDFTs of multiple training sequence bursts can be pre-calculated and pre-stored).

Further, the IDFTs of multiple training sequence bursts in CSPS and CSIPS can be derived from a single IDFT of a pilot burst.

For MPSA, there is no redundancy to be added and there is no signaling required. Unlike soft-clipping and hard-clipping, MPSA does not distort the precoded signal.

Also, MPSA can effectively reduce the PAPR of PCE2 signals.

Figure 20:
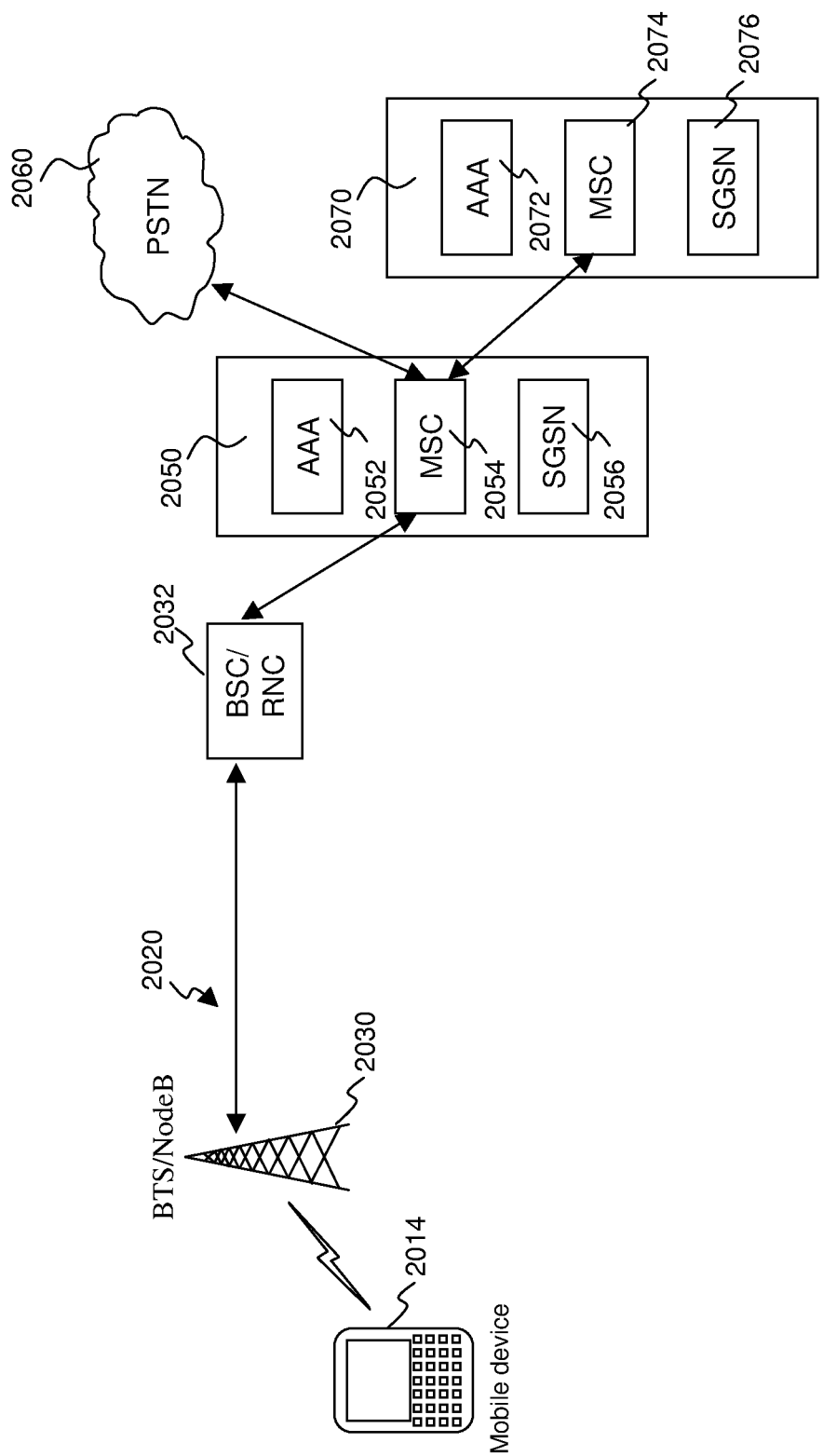
FIG. 20 is a block diagram of an exemplary network architecture.
Figure 21:
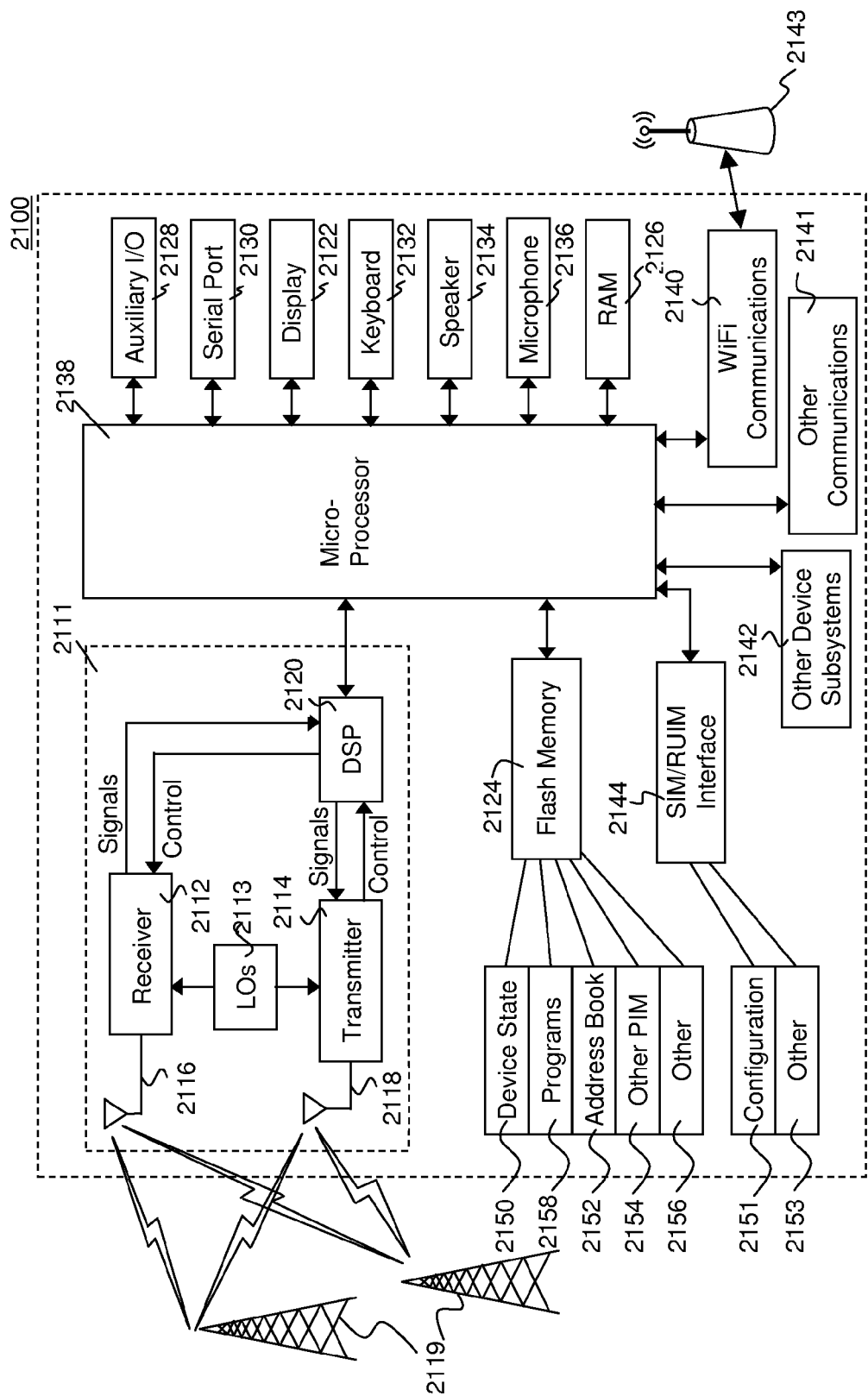
FIG. 21 is a block diagram of an exemplary mobile device.

The methods and coding of FIGS. 1 to 3, 5 to 9 and 19, can be performed by any network element. As used herein, a network element can be a network side server or a mobile device. Reference is now made to FIGS. 20 and 21, which show exemplary network and mobile device architectures.

FIG. 20 illustrates an architectural overview for an exemplary network. A mobile device 2014 is configured to communicate with cellular network 2020.

Mobile device 2014 may connect through cellular network 2020 to provide either voice or data services. As will be appreciated, various cellular networks exist, including, but not limited to, global system for mobile communication (GSM), GPRS, EGPRS, EGPRS2, among others. These technologies allow the use of voice, data or both at one time.

Cellular network 2020 comprises a base transceiver station (BTS)/Node B 2030 which communicates with a base station controller (BSC)/Radio Network Controller (RNC) 2032. BSC/RNC 2032 can access the mobile core network 2050 through either the mobile switching center (MSC) 2054 or the serving GPRS switching node (SGSN) 2056. MSC 2054 is utilized for circuit switched calls and SGSN 2056 is utilized for data packet transfer. As will be appreciated, these elements are GSM/UMTS specific, but similar elements exist in other types of cellular networks.

Core network 2050 further includes an authentication, authorization and accounting module 2052 and can further include items such as a home location registry (HLR) or visitor location registry (VLR).

MSC 2054 connects to a public switched telephone network (PSTN) 2060 for circuit switched calls. Alternatively, for mobile-to-mobile calls the MSC 2054 may connect to an MSC 2074 of core network 2070. Core network 2070 similarly has an authentication, authorization and accounting module 2072 and SGSN 2076. MSC 2074 could connect to a second mobile device through a base station controller/node B or an access point (not shown). In a further alternative embodiment, MSC 2054 may be the MSC for both mobile devices on a mobile-to-mobile call.

In accordance with the present disclosure, any network element, including mobile device 2014, BTS 2030, BSC 2032, MSC 2052, and SGSN 2056 could be used to perform the methods and encoding/decoding of FIGS. 1 to 3, 5 to 9 and 19. In general, such network element will include a communications subsystem to communicate with other network elements, a processor and memory which interact and cooperate to perform the functionality of the network element.

Further, if the network element is a mobile device, any mobile device may be used. One exemplary mobile device is described below with reference to FIG. 21. The use of the mobile device of FIG. 21 is not meant to be limiting, but is provided for illustrative purposes.

Mobile device 2100 is a two-way wireless communication device having at least voice or data communication capabilities. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 2100 is enabled for two-way communication, it can incorporate a communication subsystem 2111, including both a receiver 2112 and a transmitter 2114, as well as associated components such as one or more, antenna elements 2116 and 2118, local oscillators (LOs) 2113, and a processing module such as a digital signal processor (DSP) 2120 The particular design of the communication subsystem 2111 depends upon the communication network in which the device is intended to operate.

When required network registration or activation procedures have been completed, mobile device 2100 may send and receive communication signals over the network 2119. As illustrated in FIG. 21, network 2119 can comprise of multiple base stations communicating with the mobile device.

Signals received by antenna 2116 through communication network 2119 are input to receiver 2112, which may perform such common receiver functions as signal amplification, frequency down conversion, filtering, channel selection and the like, and in the example system shown in FIG. 21, analog to digital (A/D) conversion. A/D conversion of a received signal allows more complex communication functions such as demodulation and decoding to be performed in the DSP 2120. In a similar manner, signals to be transmitted are processed, including modulation and encoding for example, by DSP 2120 and input to transmitter 2114 for digital to analog conversion, frequency up conversion, filtering, amplification and transmission over the communication network 2119 via antenna 2118. DSP 2120 not only processes communication signals, but also provides for receiver and transmitter control. For example, the gains applied to communication signals in receiver 2112 and transmitter 2114 may be adaptively controlled through automatic gain control algorithms implemented in DSP 2120.

Network access requirements will also vary depending upon the type of network 2119. In some networks network access is associated with a subscriber or user of mobile device 2100. A mobile device may require a removable user identity module (RUIM) or a subscriber identity module (SIM) card in order to operate on a network. The SIM/RUIM interface 2144 is normally similar to a card-slot into which a SIM/RUIM card can be inserted and ejected. The SIM/RUIM card hold many key configurations 2151, and other information 2153 such as identification, and subscriber related information.

Mobile device 2100 includes a processor 2138 which controls the overall operation of the device. Communication functions, including at least data and voice communications, are performed through communication subsystem 2111. Processor 2138 also interacts with further device subsystems such as the display 2122, flash memory 2124, random access memory (RAM) 2126, auxiliary input/output (I/O) subsystems 2128, serial port 2130, one or more keyboards or keypads 2132, speaker 2134, microphone 2136, other communication subsystem 2140 such as a short-range communications subsystem and any other device subsystems generally designated as 2142. Serial port 2130 could include a USB port or other port known to those in the art.

Some of the subsystems shown in FIG. 21 perform communication-related functions, whereas other subsystems may provide "resident" or on-device functions. Notably, some subsystems, such as keyboard 2132 and display 2122, for example, may be used for both communication-related functions, such as entering a text message for transmission over a communication network, and device-resident functions such as a calculator or task list.

Operating system software used by the processor 2138 can be stored in a persistent store such as flash memory 2124, which may instead be a read-only memory (ROM) or similar storage element (not shown). Specific device applications, or parts thereof, may be temporarily loaded into a volatile memory such as RAM 2126. Received communication signals may also be stored in RAM 2126.

As shown, flash memory 2124 can be segregated into different areas for both computer programs 2158 and program data storage 2150, 2152, 2154 and 2156. These different storage types indicate each program can allocate a portion of flash memory 2124 for their own data storage requirements. Processor 2138, in addition to its operating system functions, can enable execution of software applications on the mobile device. A predetermined set of applications which control basic operations, including at least data and voice communication applications for example, will normally be installed on mobile device 2100 during manufacturing. Other applications could be installed subsequently or dynamically.

A software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application can have the ability to send and receive data items, via the wireless network 2119. In an embodiment, the PIM data items are seamlessly integrated, synchronized and updated, via the wireless network 2119, with the mobile device user's corresponding data items stored or associated with a host computer system. Further applications may also be loaded onto the mobile device 2100 through the network 2119, an auxiliary I/O subsystem 2128, serial port 2130, short-range communications subsystem 2140 or any other suitable subsystem 2142, and installed by a user in the RAM 2126 or a non-volatile store (not shown) for execution by the microprocessor 2138. Such flexibility in application installation increases the functionality of the device and may provide enhanced on-device functions, communication-related functions, or both.

In a data communication mode, a received signal such as a text message or web page download will be processed by the communication subsystem 2111 and input to the microprocessor 2138, which further processes the received signal for element attributes for output to the display 2122, or alternatively to an auxiliary I/O device 2128.

A user of mobile device 2100 may also compose data items such as email messages for example, using the keyboard 2132, which can be a complete alphanumeric keyboard or telephone-type keypad in some embodiments, in conjunction with the display 2122 and possibly an auxiliary I/O device 2128. Such composed items may then be transmitted over a communication network through the communication subsystem 2111.

For voice communications, overall operation of mobile device 2100 is similar, except that received signals would be output to a speaker 2134 and signals for transmission would be generated by a microphone 2136. Alternative voice or audio I/O subsystems, such as a voice message recording subsystem, may also be implemented on mobile device 2100. Although voice or audio signal output is accomplished primarily through the speaker 2134, display 2122 may also be used to provide an indication of the identity of a calling party, the duration of a voice call, or other voice call related information for example.

Serial port 2130 in FIG. 21 would normally be implemented in a personal digital assistant (PDA)-type mobile device for which synchronization with a user's desktop computer (not shown) may be desirable, but is an optional device component. Such a port 2130 would enable a user to set preferences through an external device or software application and would extend the capabilities of mobile device 2100 by providing for information or software downloads to mobile device 2100 other than through a wireless communication network. The alternate download path may for example be used to load an encryption key onto the device through a direct and thus reliable and trusted connection to thereby enable secure device communication. Serial port 2130 can further be used to connect the mobile device to a computer to act as a modem.

WiFi Communications Subsystem 2140 is used for WiFi Communications and can provide for communication with access point 2143.

Other communications subsystem(s) 2141, such as a short-range communications subsystem, are further components that may provide for communication between mobile device 2100 and different systems or devices, which need not necessarily be similar devices. For example, the subsystem(s) 2141 may include an infrared device and associated circuits and components or a Bluetooth™ communication module to provide for communication with similarly enabled systems and devices.

The embodiments described herein are examples of structures, systems or methods having elements corresponding to elements of the techniques of the present application. The above written description may enable those skilled in the art to make and use embodiments having alternative elements that likewise correspond to the elements of the techniques of the present application. The intended scope of the techniques of the above application thus includes other structures, systems or methods that do not differ from the techniques of the present application as described herein, and further includes other structures, systems or methods with insubstantial differences from the techniques of the present application as described herein.

The invention claimed is:

1. A method comprising:
   precoding data symbols using an inverse discrete Fourier transform (IDFT);
   choosing, at a transmitter, a set of training sequence symbols from a plurality of sets of training sequence symbols; and
   creating, at the transmitter, an IDFT precoded burst for transmission by adding the IDFT of the precoded data symbols and an IDFT of the chosen set of training sequence symbols.

2. The method of claim 1, further comprising calculating a peak to average power ratio for the IDFT precoded burst.

3. The method of claim 2, wherein the chosen set of training sequence symbols is picked such that the calculated peak to average power ratio for the IDFT precoded burst is the lowest amongst all of the plurality of sets of training sequence symbols or is less than or equal to a predetermined value.

4. The method of claim 2, wherein, after creating the IDFT precoded burst, said IDFT precoded burst is filtered using a transmit pulse shaping filter and before the peak to average power ratio calculation.

5. The method of claim 4, wherein, after the peak to average power ratio calculation, the method performs the choosing and creating steps for a new set of training sequence symbols if the peak to average power ratio value is greater than a predetermined value.

6. The method of claim 1, wherein each set within the plurality of sets of training sequence symbols is known to a receiver.

7. The method of claim 1, wherein, after creating the IDFT precoded burst, a cyclic prefix is appended to said IDFT precoded burst.

8. The method of claim 7, wherein each of the plurality of sets of training sequence symbols is IDFT precoded, added with a cyclic prefix, filtered and stored in a memory of the transmitter.

9. The method of claim 1, wherein the IDFT precoded data symbols are filtered by a transmit pulse shaping filter prior to the creating, and wherein the training sequence symbols are IDFT precoded and filtered by the same transmit pulse shaping filter prior to the creating.

10. The method of claim 9, wherein each of the plurality of sets of training sequence symbols is IDFT precoded, added with a cyclic prefix, filtered and stored in a memory of the transmitter.

11. The method of claim 9, wherein at least one of the plurality of sets of training sequence symbols is IDFT precoded, added with a cyclic prefix, filtered and stored in a memory of the transmitter and the remaining of the plurality of sets of training sequence symbols are obtained by operation on the at least one set of stored set of training sequence symbols.

12. The method of claim 1, wherein each of the plurality of sets of training sequence symbols is IDFT precoded and stored in a memory of the transmitter.

13. The method of claim 1, wherein at least one of the plurality of sets of training sequence symbols is IDFT precoded and stored in a memory of the transmitter and the remaining of the plurality of sets of training sequence symbols are obtained by operation on the at least one stored IDFT precoded set of training sequence symbols.

14. A communications subsystem in a mobile device, the communications subsystem comprising:
- a transmitter;
- memory configured to store instructions; and
- a processor configured to execute the instructions to:
  - precede data symbols using an inverse discrete Fourier transform (IDFT);
  - choose, at the transmitter, a set of training sequence symbols from a plurality of sets of training sequence symbols; and
  - create, at the transmitter, an IDFT preceded burst for transmission by adding the IDFT of the precoded data symbols and an IDFT of the chosen set of training sequence symbols.

15. The communications subsystem of claim 14, wherein the processor configured to execute the instructions is further configured to calculate a peak to average power ratio for the IDFT precoded burst.

16. The communications subsystem of claim 14, wherein the processor configured to execute the instructions is further configured to filter the IDFT preceded data symbols by a transmit pulse shaping filter prior to the creating, and IDFT precede and filter the training sequence symbols by the same transmit pulse shaping filter prior to the creating.

17. The communications subsystem of claim 14, wherein the memory stores each of the plurality of sets of training sequence symbols after the IDFT preceding.

18. The communications subsystem of claim 14, wherein the memory stores an IDFT of at least one of the plurality of sets of training sequence symbols, and the processor configured to execute the instructions is further configured to obtain the remaining of the plurality of sets of training sequence symbols by mathematical operation on the stored IDFT of at least one of the plurality of sets of training sequence symbols.

19. A non-transitory computer-readable storage medium storing instructions that when executed by at least one processor, cause the at least one processor to perform operations of:
- precoding data symbols using an inverse discrete Fourier transform (IDFT);
- choosing, at a transmitter, a set of training sequence symbols from a plurality of sets of training sequence symbols; and
- creating, at the transmitter, an IDFT precoded burst for transmission by adding the IDFT of the precoded data symbols and an IDFT of the chosen set of training sequence symbols.

* * * * *

UNITED STATES PATENT AND TRADEMARK OFFICE
CERTIFICATE OF CORRECTION

PATENT NO. : 9,083,593 B2
APPLICATION NO. : 14/004676
DATED : July 14, 2015
INVENTOR(S) : Yan Xin et al.

Page 1 of 1

It is certified that error appears in the above-identified patent and that said Letters Patent is hereby corrected as shown below:

In the claims

Column 17, Line 6, In Claim 14, delete "precede" and insert -- precode --, therefor.

Column 17, Line 11, In Claim 14, delete "preceded" and insert -- precoded --, therefor.

Column 17, Line 21, In Claim 16, delete "preceded" and insert -- precoded --, therefor.

Column 17, Line 23, In Claim 16, delete "precede" and insert -- precode --, therefor.

Column 18, Line 3, In Claim 17, delete "preceding." and insert -- precoding. --, therefor.

Signed and Sealed this
Fifteenth Day of December, 2015

Michelle K. Lee
*Director of the United States Patent and Trademark Office*